3,136,667
PROPELLANT COMPOSITIONS COMPRISING ALUMINUM CONTAINING POLYMERS

Gaetano F. D'Alelio, South Bend, Ind., assignor, by direct and mesne assignments, to Dal Mon Research Co., Cleveland, Ohio, a corporation of Delaware
No Drawing. Filed June 5, 1961, Ser. No. 135,088
20 Claims. (Cl. 149—19)

This invention relates to polymers containing aluminum. Because of the high energy content of such compounds, aluminum compounds having aluminum to carbon bonds, such as aluminum alkyls, have been suggested as fuel compositions. However, because of their tendency to ignite spontaneously upon exposure to air, and the highly reactive nature of these compounds, the use of aluminum alkyls involves considerable danger and necessitates various precautionary steps. Moreover, since they are liquids, their use as propellant fuels for rockets, missiles, and related devices, has the drawbacks common to liquid fuels in that complicated containers and pumping devices are required, and the sloshing effect of the liquids in their containers causes shifting of weight which adversely affects directional control.

In accordance with the present invention, polymeric compounds having high proportions of aluminum have been discovered which have more easily controlled flamability and reactivity than the aluminum alkyls while still retaining high energy content. Such polymeric materials can be made in the solid state and thereby have the inherent advantages of solid fuels for propelling purposes.

It has been known that olefins can be reacted with aluminum hydrides, aluminum alkyls, and aluminum alkyl hydrides, to replace hydrogen or alkyl groups in the aluminum compound. Zeigler et al. U.S. Patent 2,826,598, dated March 11, 1958, shows such additions. Example VIII in column 11 of that patent, shows the reaction of butadiene with aluminum diethyl hydrides to give $(H_7C_4)Al(C_2H_5)_2$ and $(C_2H_2)_2AlCH_2CH_2CH_2Al(C_2H_2)_2$. In the latter formula unless the $C_2H_2$ groups in the parentheses are typographical errors and are intended to be $C_2H_5$ groups as in the first formula, and as in the starting material, then the only possible structure is a cyclic ring including Al and two ethylenic groups.

It has surprisingly been found now that polyalkenyl compounds, such as butadiene, etc., and the aluminum hydrides and/or hydrocarbon derivatives, such as indicated in the patent, can be made to react in such a manner as to produce polymers having aluminum in the polymer chain and in relatively high proportions. Whereas the above-cited patent teaches proportions of 1 to 6 moles of olefin per metal equivalent, which is 3 to 18 moles of olefin per atom of aluminum, the polymeric products of the present invention can contain a proportion of less than 1 mole of olefin per atom of aluminum. While even more olefin can be used, depending on how low a percentage of aluminum is desired, it is generally preferred to have no more than about 2.5 moles of olefin per atom of aluminum in the polymer. On the basis of metal equivalents, as used in the cited patent, this preferred range is translated to mean from less than 0.3 moles to about 0.8 moles of olefin per equivalent of aluminum. Even when higher proportions of olefin are used in the practice of this invention, the polymeric products differ from the polymeric products described in the patent, by virtue of having aluminum in the repeating unit of the polymer and generally having a higher proportion of aluminum in the polymer product.

The polymeric compositions of this invention are prepared from aluminum hydrides and various hydrocarbon derivatives thereof, which group of compounds is generally referred to hereinafter as aluminum hydride compounds. The hydrocarbon derivatives include those in which one, two, or more, including all of the hydrogen of an aluminum hydride is replaced by one or more hydrocarbon radicals, such as aliphatic, aromatic, cycloaliphatic radicals, including combinations thereof, such as aralkyl, alkaryl, cycloalkyl-aryl, aryl-cycloalkyl radicals, etc. The aluminum hydride compounds are reacted with hydrocarbon compounds (including those having substituents thereon which are nonreactive to said aluminum hydride compounds), having a plurality of ethylenically unsaturated groups therein, or at least one acetylenic group therein, including polymers containing such groups.

Typical aluminum hydride compounds that can be used in the practice of this invention include, but are not limited to, the following: aluminum hydride $(AlH_3)$, including its various polymeric forms $(AlH_3)_x$, aluminum alkyl dihydrides, aluminum dialkyl hydrides, aluminum trialkyls, various hydrocarbon derivatives of polymeric aluminum hydrides, etc. These can be used as such, or in complex form with alkali metal hydrides, such as lithium hydrides and sodium hydrides, alkali metal alkyls, ethers, thioethers, tertiary amines, etc.

Specific examples of such compounds include, but are not restricted to, the following: dimethyl aluminum hydride, diethyl aluminum hydride, dipropyl aluminum hydride, dibutyl aluminum hydride, dipentyl aluminum hydride, diphenethyl aluminum hydride, dicyclohexyl aluminum hydride, methyl aluminum dihydride, ethyl aluminum dihydride, propyl aluminum dihydride, butyl aluminum dihydride, pentyl aluminum dihydride, phenethyl aluminum dihydride, 2-ethyl-hexyl aluminum dihydride, cyclohexyl aluminum dihydride, cyclopentyl aluminum dihydride, cyclohexylethyl aluminum dihydride, cyclopentylethyl aluminum dihydride, trimethyl aluminum, triethyl aluminum, tripropyl aluminum, tributyl aluminum, triisobutyl aluminum, tripentyl aluminum, tri(2-ethyl-hexyl) aluminum, triphenethyl aluminum, tri-benzyl aluminum, tri-(2-decyl-tetradecyl) aluminum, triphenyl aluminum, tritolyl aluminum, tetramethyl dialuane, trimethyl dialuane, pentamethyl dialuane, symmetrical diethyl dialuane, tetraethyl dialuane, pentaethyl dialuane, etc.

The polymeric products of this invention range from viscous oils to solid thermoplastic or thermoset resins. Depending upon the particular starting materials, modifiers, and polymerization conditions, the polymers range in molecular weight from about 300 to 100,000 and higher. These polymeric compositions are useful as high energy fuels, either as a supplement or as the main component, and are particularly useful in the solid form for such purposes. The polymers per se and the method of preparing them are disclosed and claimed in applicant's copending application Serial No. 135,089 filed the same date herewith.

This application is a continuation in part of applicant's copending applications Serial Nos. 744,340, filed June 25, 1958, now abandoned; 761,485, filed September 17, 1958, now abandoned, and 762,226, filed September 22, 1958, now abandoned.

The polymeric compositions of this invention comprise 5–95% of a solid or liquid oxidizing agent of the type used in solid propellant fuel compositions, such as potassium perchlorate, etc., and 95–5% of a polymer represented by the formula

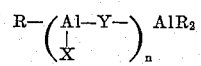

wherein X is R or Y, R is hydrogen or a hydrocarbon radical, $n$ is an integer having a value of at least 2, preferably at least 4, and Y is a polyvalent radical derived from the acetylenic and ethylenic compounds and having as many valencies as there are aluminum atoms attached thereto. When derived from a dialkenyl compound or from a monoacetylenic compound having no ethylenic groups therein, Y is a divalent radical. When derived from a monoacetylenic compound, which also has one ethylenic group therein, or from compounds having a plurality of acetylenic groups therein, or from compounds having more than two ethylenic groups therein, Y can have more than two valencies. When derived from a polymer having a considerable number of ethylenic or acetylenic groups therein, Y also has more than two valencies. The R hydrocarbon radical preferably has no more than 24 carbon atoms. A hydrocarbon nucleus of R can have attached thereto substituents which are non-reactive toward the metal compound used in the preparation of the polymer. Also additional unreacted ethylenic and acetylenic groups may also be present.

Polymers used in the compositions of this invention have a plurality of repeating units in the polymer molecules thereof of the formula $$-Al-Y- \atop |\atop X$$

wherein X and Y are as defined above.

In polymers of this invention derived from dialkenyl compounds Y is a divalent radical of the formula $$-(C_2R_3H-Z-C_2R_3H)-$$

wherein R likewise represents hydrogen, or a hydrocarbon group; and Z represents a single bond between the two carbon atoms adjacent to Z or a divalent hydrocarbon group. The hydrocarbon nucleus of R and Z can have attached thereto substituents which are nonreactive toward the aluminum compound used in the preparation of the polymer. However, additional ethylenic groups can also be attached to R and Z.

While it is believed that each aluminum atom becomes attached to one of the carbon atoms of an ethylenic group, it is also possible that the aluminum migrates, during or after the reaction between the aluminum compound and the polyalkenyl compound, and becomes attached to any other carbon atom of the polyalkenyl compound that will give a more stable derivative. Thus, the aluminum may actually be attached to one of the R groups or to Z. For that reason Y is represented as a divalent radical having the formula $$-C_2R_3H-Z-C_2R_3H-$$

without pinpointing the carbon atoms to which the aluminum is actually attached.

Accordingly, the polymeric products are represented by the formula $$R-[-Al-(C_2R_3H-Z-C_2R_3H)-]_nAlR_2 \atop |\atop X$$

When the aluminum becomes attached and does not migrate from the ethylenic group, the polymeric product can probably be represented by the following formula

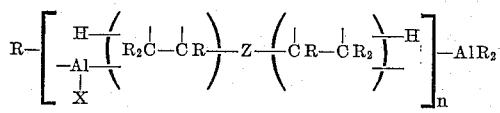

or generally can be simplified, particularly where the ethylenic groups are vinyl or vinylidene groups, to:

$$R-(-Al-CR_2-CHR-Z-CHR-CR_2-)_n-AlR_2 \atop |\atop X$$

When infusible polymers are obtained by the practice of this invention, the crosslinkages between linear polymer chains, such as represented above when X is Y, can generally be represented by replacing an R group from an aluminum atom in two different polymer molecules and substituting for two such R groups the divalent radical Y which can also be represented as $$-(C_2R_3H-Z-C_2R_3H)-$$

In accordance with the preceding, specific Y radicals which fit the above formula appear in the following repeating unit formulas which are derived from various examples described hereinafter. For example, in Examples I–III, the polymers have a repeating unit structure of $$-Al-C_2H_4C_6H_4C_2H_4- \atop |\atop C_2H_5$$

In Example IV, the product has a repeating unit structure of $$-Al-C_6H_{12}- \atop |\atop C_3H_7$$

The products of Example V have repeating unit structures respectively of $$-AlC_2H_4C_6H_{10}C_2H_4-; \quad -AlC_3H_6C_6H_{10}C_3H_6- \atop |\atop C_2H_5 \qquad\qquad |\atop C_2H_5$$

and $$-AlC_2H_4C_6H_8C_2H_4- \atop |\atop C_2H_5$$

The products of Examples VI and VII have a repeating unit structure of $$-AlC_3H_6C_6H_4C_3H_6- \atop |\atop C_2H_5$$

In Examples VII, IX, Ia, IIIa, XIIIa, IIb and IIIb, the polymers have the following repeating units respectively:

$$-Al-C_4H_8-; \quad -Al-C_4H_7-; \quad -Al-C_2H_4- \atop |\atop C_2H_5 \qquad |\atop C_2H_5\ CH_3 \qquad |\atop C_4H_9$$

$$-Al-C_3H_6-; \quad -Al-C_2H_4-; \quad -CH_2CH- \atop |\atop C_2H_5 \qquad |\atop C_2H_5 \qquad |\atop C_6H_4 \atop |\atop C_2H_4Al(C_2H_5)_2$$

and $$-CH_2CH- \atop |\atop C_2H_4 \atop |\atop Al(C_4H_9)_2$$

When the aluminum hydride compound has no more than one hydrocarbon group attached to each aluminum atom, such as aluminum hydride, methyl aluminum dihydride, ethyl aluminum dihydride, propyl aluminum dihydride, symmetrical dimethyl dialuane, symmetrical diethyl dialuane, 1,2,3-trimethyl trialuane, etc., and a polyunsaturated compound is used which has two vinyl groups, it is believed that the polymerization generally proceeds linearly, at least initially, as follows:

$$RAlH_2 + CH_2=CH-Z-CH=CH_2 \longrightarrow$$

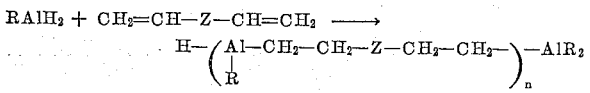

When an aluminum hydride compound which has two or more hydrocarbon groups on each aluminum atom or a linear polymer, such as above, is used in which the R on the aluminum is a hydrocarbon group, at least some of the hydrocarbon groups are displaced by the dialkenyl compound. For example, when the three R's on each aluminum atom are hydrocarbon groups, the polymer is generally believed to proceed linearly, at least initially, as follows:

$$AlR_3 + R_2C-CR-Z-CR-CR_2 \longrightarrow$$

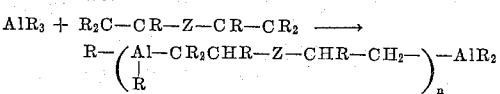

In the preceding reaction when conditions permit, the hydrocarbon group which is replaced by the polyalkenyl compound, generally escapes from the system as an olefin. In cases of closed systems, the buildup of pressure, or reluctance of a radical such as phenyl toward olefin formation, can result in the attachment of the hydrocarbon group to the carbon atom of the ethylenic group other than the one to which the aluminum is attached.

When crosslinking is effected the crosslinked portion of the polymer generally can be represented as:

$$-Al-CR_2CHR-Z-CHRCR_2-$$
$$|$$
$$CR_2$$
$$|$$
$$CHR$$
$$|$$
$$Z$$
$$|$$
$$CHR$$
$$|$$
$$CR_2$$
$$|$$
$$-Al-CR_2CHR-Z-CHRCR_2-$$

Various modifications of polymeric materials can be made according to the practice of this invention by adjusting the proportions of reactants and the conditions under which the materials are made to react. For example, control of the proportions of reactants enables control over the amount of crosslinking and the amount of polymer formation before crosslinking is effected. Thus, by increasing the proportion of the dialkenyl compound, a higher degree of conversion to polymer can be effected before crosslinking begins. Likewise, the higher the ratio of aluminum compound to polyalkenyl compound, the lower is the degree of conversion before crosslinking takes place. The selectivity, type of reaction, and product, can be controlled somewhat by selecting appropriate aluminum compounds, concentrations thereof, the polyalkenyl compound, and also by the use of certain amounts of monoalkenyl compounds. For example, since the hydrogen in these aluminum compounds is more easily replaced than alkyl groups, it is possible thereby to control somewhat the type and extent of reaction.

On the basis that functionality of the aluminum compound is 3 and that of a dialkenyl compound is equivalent to 2, since each unsaturated group acts as a monoalkylating agent, a rough estimate of the extent of reaction can be calculated from the functionality equation $P=2/F$ where P equals the extent of reaction and F is the functionality of the system. Approximate values derived from such calculations are shown in the following table:

| Aluminum Compound (Moles) | Dialkenyl Compound (Moles) | Approximate extent of reaction before crosslinking, percent |
|---|---|---|
| 1 | 4 | 91 |
| 1 | 3 | 89 |
| 1 | 2 | 86 |
| 1 | 1 | 80 |
| 3 | 2 | 77 |
| 2 | 1 | 75 |
| 3 | 1 | 73 |
| 4 | 1 | 72 |

As indicated by these calculations, the higher the mole ratio of the aluminum compound to the dialkenyl compound, the sooner the crosslinking is likely to occur as the reaction proceeds. When a mole of trialkenyl compound, such as $HC(CH=CH_2)_3$ or $C_6H_3(CH=CH_2)_3$, is reacted with a mole of aluminum hydride compound, $AlR_3$, the value for P approaches 67%, and when a tetraalkenyl compound such as $C(CH=CH_2)_4$ is used, the gellation value P approximates 57%.

When it is desired to prepare a thermoplastic resin according to the practice of this invention, either for use as such or for mixture with other materials, or intermediate treatment prior to conversion to an infusible resin, it is advantageous to use an aluminum compound having one hydrocarbon group per aluminum atom. However, thermoplastic resins can also be prepared by controlling the reaction conditions when unsubstituted aluminum hydrides are used, or when aluminum compounds are used having more than one hydrocarbon substituent per aluminum atom. The preparation of thermoplastic resins can also be facilitated by the use of limited amounts of mono- alkenyl compounds which will replace some of the hydrogen on aluminum hydrides and thereby retard crosslinking until desired, at which time higher temperatures can be used to replace such alkyl groups with the polyalkenyl compound. Thus, when it is desired to control the molecular weight of a linear polymer, or to put terminal hydrocarbon groups on a polymer chain, this can be accomplished by using a mono-olefin, such as ethylene, together with the polyalkenyl compound. The latter can also be effected by using a tri-substituted aluminum, alone or together with an unsubstituted or mono-substituted aluminum hydride.

Some control over the type and extent of reaction can be effected by using aluminum hydride compounds having hydrocarbon groups of different sizes. It is sometimes desirable, also, that the hydrocarbon group to be replaced by the polyalkenyl compound is of a smaller size than the polyalkenyl compound. This is particularly desirable where there is a displaced hydrocarbon group escaping as a byproduct olefin. In such cases a dialkenyl compound of higher boiling point than the resultant olefin permits escape of the olefin upon refluxing of the polyalkenyl compound or upon maintaining the reaction temperature below that at which the polyalkenyl compound vaporizes to an undesirable extent. In some cases, particularly where the difference in volatility is not great, the olefin can be permitted to escape in a stream of the polyalkenyl compound passing through the system, or in a stream of inert gas with additional polyalkenyl compound being fed to the system. In cases where the polyalkenyl compound has a higher vapor pressure than any olefin that might be given off as byproduct, a closed system can advantageously be used to favor the desired displacement.

The temperature conditions for the promotion of polymer formation in accordance with the practice of this invention vary in accordance with the reactivity of the reagents being used. When an aluminum hydride is being reacted with a polyalkenyl compound, a temperature in the range of 70–80° C. is generally suitable. When aluminum hydride compounds containing both hydrogen and hydrocarbon groups are used, the reaction can be controlled mainly to displace the hydrogen by keeping the temperature below 100° C. When hydrocarbon groups are to be displaced from an aluminum hydride compound, a temperature of about 100–120° C. is preferred. Depending upon the decomposition temperature of the particular reagent and the polymeric product, it is generally advantageous not to exceed a temperature of about 140° C. When a mixture of an aluminum hydride and an aluminum hydride compound containing hydrocarbon groups is being used, it is generally desirable to maintain the appropriate temperature until most of the hydrogen has been displaced and then to raise the temperature to that more suitable for displacement of the hydrocarbon group. In some cases the temperature control can be facilitated by the use of an inert solvent, such as heptane, octane, benzene, toluene, xylene, etc., whose boiling point is close to the desired temperature.

The time required for polymer formation varies in accordance with the reactivity of the ethylenic groups in the polyalkenyl compound, the type of group to be displaced in the aluminum hydride compound, the temperature being used, and various other factors which would favor the reaction, such as the use of metal catalysts, such as nickel, cobalt, etc., the removal of the byproduct olefin, etc. With respect to the last condition, an increase in concentration of such byproduct olefin promotes an equilibrium which competes with the progress of the polymer formation. Therefore, unless the olefin is permitted to escape, or it is absorbed by addition, this tends to slow down the polymerization. The polymerization proceeds most rapidly with vinyl groups in the polyalkenyl compound. Vinylidene groups also react rapidly when the second group attached to the doubly substituted carbon is relatively small. With larger groups in that position, longer reaction times and increased temperatures, but still below decomposition temperature, are desirable. Ethylenic groups having hydrocarbon groups attached to both the alpha and the beta carbon atoms are still less reactive than the vinylidene groups, and require longer reaction time even at the more favorable temperature conditions. The time will also vary in accordance with the degree of polymerization required. While the more active reagents can give polymers in even less time, many of the polymeric products of this invention can be produced at moderate temperatures in a matter of 12 to 48 hours. In some cases, such as, with the non-reactive type of ethylenic groups, or when low temperatures, for example as low as 50° C., are used, much longer reaction periods are desirable. In such cases, the reaction is continued until a solid product is obtained.

Polyalkenyl compounds that can be used in the practice of this invention include those having the formula $R_2C=CR-Z-CR=CR_2$ wherein R and Z are as defined above. Typical polyalkenyl compounds that can be used in the practice of this invention, include, but are not limited to, the following: allene, butadiene, isoprene, 2,3-dimethyl butadiene, pentadiene-1,3, hexadiene-2,4, octadiene-2,4, hexatriene-1,3,5, 2-phenyl-butadiene, 1,4-pentadiene, hexadiene-1,5, 2,4-dimethyl-pentadiene-1,4, vinyl cyclohexene, 1-phenyl-pentadiene-1,3, divinyl cyclohexane, diallyl, 1,6-heptadiene, 1,8-nonadiene, 2,8-decadiene, 2,9-dimethyl-2,8-decadiene, divinyl cyclopentane, divinyl methyl cyclohexane, diallyl cyclohexane, diallyl cyclopentane, dibutenyl cyclohexane, dipentenyl cyclohexane, allyl cyclohexene, diallyl cyclohexene, divinyl cyclohexane, (beta-vinylalkyl)-furane, (beta-allyl-ethyl)-furane, 1,7-diphenyl-heptadiene-1,6, 2,7-diphenyl-octadiene-1,7, etc.

Polyalkenyl aryl compounds which can be used in the practice of this invention include; divinyl benzene, trivinyl benzene, divinyl naphthalene, trivinyl naphthalene, divinyl diphenyl, trivinyl diphenyl, divinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyldiphenyl, divinyl ethoxy naphthalene, divinyl chloronaphthalene, divinyl chlorodiphenyl, divinyl ethoxy diphenyl, vinyl isopropenyl benzene, vinyl isopropenyl naphthalene, vinyl isopropenyl diphenyl, vinyl isopropenyl toluene, vinyl isopropenyl anisole, vinyl isopropenyl chlorobenzene, vinyl isopropenyl methoxy naphthalene, vinyl isopropenyl chloronaphthalene, vinyl isopropenyl methyl chloronaphthalene, vinyl isopropenyl chlorodiphenyl, vinyl isopropenyl methoxy diphenyl, vinyl isobutenyl benzene, vinyl isobutenyl naphthalene, vinyl isobutenyl diphenyl, vinyl allyl benzene, vinyl allyl naphthalene, vinyl allyl diphenyl, vinyl allyl toluene, vinyl allyl anisole, vinyl allyl methylnaphthalene, vinyl allyl chlorodiphenyl, diallyl benzene, triallyl benzene, diallyl naphthalene, triallyl naphthalene, diallyl diphenyl, triallyl diphenyl, diallyl toluene, diallyl xylene, diallyl chlorobenzene, diisopropenyl benzene, diisopropenyl naphthalene, diisopropenyl diphenyl, diisopropenyl toluene, diisopropenyl anisole, diisopropenyl methyl naphthalene, diisopropenyl chlorodiphenyl, dimethallyl benzene, dimethallyl naphthalene, dimethallyl diphenyl, bis-(alpha-ethyl-ethenyl)-benzene, bis-(alpha-ethyl-ethenyl)-naphthalene, bis-(alpha-ethyl-ethenyl)-diphenyl, bis-(alpha-vinyl-ethyl)-benzene, bis-(alpha-vinyl-ethyl)-naphthalene, bis-(alpha-vinyl-ethyl)-diphenyl, vinyl (alpha-vinyl-ethyl)-benzene, vinyl (alpha-vinyl-ethyl)-naphthalene, vinyl (alpha-vinyl-ethyl)-diphenyl, etc.

Other polyalkenyl aryl compounds that can be used include: dipropenyl benzene, p-propenyl styrene, para-propenyl isopropenyl-benzene, dicrotyl benzene, dicrotyl naphthalene, dicrotyl diphenyl, dicrotyl anisole, dicrotyl xylene, bis-(4-vinyl-n-butyl)-benzene, bis-(5-isopropenyl-n-hexyl)-benzene, bis-(5-isopropenyl-n-hexyl)-diphenyl, bis-(5-methyl-hepten-5-yl)-benzene, bis-(5-methyl-nonene-6-yl)-diphenyl, bis-(n-decen-5-yl)-toluene, di-cyclopentenyl-naphthalene, divinyl carbazole, di-cyclohexenyl-benzene, etc.

Typical mono-alkenyl modifiers that can be used in the practice of this invention include, but are not limited to, the following: ethylene, propylene, butene-1, butene-2, hexene-1, hexene-2, p-butyl-ethylene, 2,4,4-trimethyl-1-pentene, 2,4,4-trimethyl-pentene-2, cyclopentene, cyclohexene, styrene, 1,1-diphenyl ethylene, vinyl cyclohexane, alpha-methyl-styrene, vinyl naphthalene, beta-methyl styrene, allyl benzene, allyl cyclohexane, decene-1, decene-2, decene-3, decene-4, decene-5, dodecene-1, dodecene-2, tetradecene-1, hexadecene-1, cycloheptene, etc.

Various methods of practicing the invention are illustrated by the following examples. These examples are intended merely to illustrate the invention and not in any sense to limit the manner in which the invention can be practiced. The parts and percentages recited therein, and also in the specification, unless specifically provided otherwise, refer to parts by weight and percentages by weight. Unless indicated otherwise, the terms "polymer" and "polymeric" are intended to include "copolymers" and "copolymeric." Molecular weights given herein are Staudinger molecular weights.

With regard to acetylenic or allenic starting compounds, while it is believed that each metal atom becomes attached to one of the carbon atoms of the acetylenic or allenic group, it is also possible that the metal migrates during or after the reaction between the metal hydride compound and the acetylenic or allenic compound, and becomes attached to any other carbon atom of the acetylenic or allenic compound that gives a more stable derivative. Thus, when the acetylenic compound is represented as $RC{\equiv}CR$, wherein R is hydrogen or a hydrocarbon group, the metal can actually be attached to one of the carbon atoms of the acetylenic group, or in the R group. For that reason, Y is represented as a polyvalent radical without pinpointing the carbon atom to which the metal is attached. This also applies with respect to polyalkenyl compounds.

In accordance with the above discussion, typical Y groups derived from acetylenic and allenic compounds include, but are not restricted to, the following:

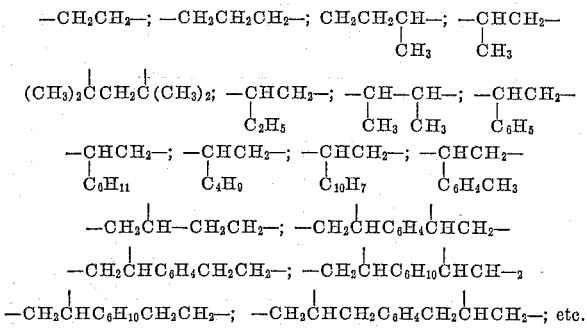

It is also believed that when infusible polymers are obtained by the practice of this invention, the crosslinkages between linear polymer chains, such as represented above, can generally be represented by replacing an R group from a metal atom in two different polymer molecules and substituting for two such R groups, the polyvalent radical Y. Moreover, if the acetylenic compound has a second acetylene group, or an allenic group, or an ethylene group therein, crosslinking can be effected by attachment of a metal atom to such second acetylenic group, or said allenic group, or said ethylenic group, and in turn is connected directly or indirectly to a second polymer molecule.

Accordingly, the polymeric products of this invention derived from acetylenic compounds can generally be represented by the formula:

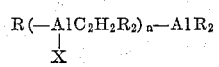

When the aluminum becomes attached and does not migrate from the acetylenic group, the polymeric product is believed to be represented by the following formula:

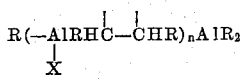

In the above formulas R represents hydrogen or a hydrocarbon group; n is an integer having a value of at least 2, preferably at least 4; the hydrocarbon nucleus of R can have attached thereto substituents which are non-reactive toward the aluminum hydride compound being used. However, additional acetylenic groups can also be attached to one or more R's, and one ethylenic group can be attached to or included in one of the R's.

Likewise, the polymeric products derived from allenic compounds are believed to be represented by the corresponding formulas:

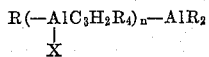

and

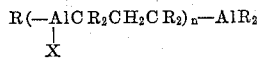

respectively.

When the aluminum hydride compound has no more than one hydrocarbon group attached to each aluminum atom, such as aluminum hydride, dialuane, trialuane, methyl aluminum dihydride, ethyl aluminum dihydride, propyl aluminum dihydride, etc., and an acetylenic or allenic compound is used, it is believed that polymerization proceeds linearly, at least initially, as follows:

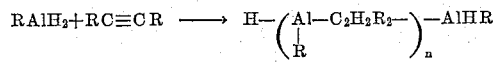

or

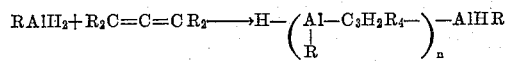

When an aluminum hydride compound is used which has two or more hydrocarbon groups on each aluminum atom, or a linear polymer, such as above, is used in which the R on the aluminum is a hydrocarbon group, the hydrocarbon groups can be displaced by the acetylenic or allenic compound and the R groups liberated as the corresponding olefin. For example, when the three R's on each aluminum atom are hydrocarbon groups, the polymer is believed to proceed linearly, at least initially, as follows:

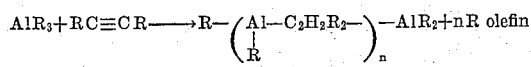

or

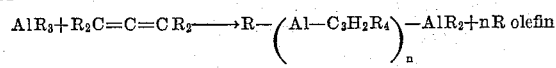

When crosslinking is effected through aluminum atoms, it is believed that the crosslinked portion of the polymer can be represented as:

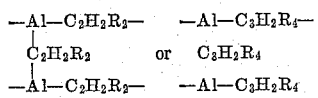

When crosslinking is effected through an additional unsaturated group in the acetylenic or allenic compound, it is believed that the cross-linked portion of the polymer can be represented as:

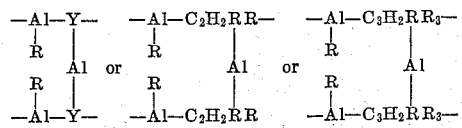

In the preceding reaction when conditions permit, the hydrocarbon group, which is replaced by the polyalkenyl compound, generally escapes from the system as an olefin. In cases of closed systems, the buildup of pressure, or reluctance of a radical such as phenyl toward olefin formation, can result in the attachment of the hydrocarbon group to the carbon atom of the ethylenic group other than the one to which the aluminum is attached.

Various modifications of polymeric materials can be made according to the practice of this invention by adjusting the proportions of reactants and the conditions under which the materials are made to react. For example, control of the proportions of reactants enables control over the amount of crosslinking and the amounts of polymer formation before crosslinking is effected. Thus, by increasing the proportion of the acetylenic or allenic compound, a higher degree of conversion to polymer can be effected before crosslinking begins. Likewise, the higher the ratio of aluminum compound to acetylenic or allenic compound, the lower is the degree of conversion before crosslinking takes place. The selectivity, type of reaction, and product, can be controlled somewhat by selecting appropriate aluminum compounds, concentrations thereof, the acetylenic or allenic compound, and also by the use of certain amounts of monoalkenyl compounds. For example, since the hydrogen in these aluminum compounds is more easily replaced than alkyl groups, it is possible thereby to control somewhat the type and extent of reaction.

On the basis that functionality of the aluminum compound is 3 and that of an acetylenic or allenic compound is equivalent to 2, since each unsaturated group acts as a dialkylating agent, a rough estimate of the extent of reaction can be calculated from the functionality equation $P = 2/F$ where P equals the extent of reaction and F is the functionality of the system. Approximate values derived from such calculations are shown in the following table:

| Aluminum Compound (Moles) | Acetylenic or Allenic Compound (Moles) | Approximate extent of reaction before crosslinking, percent |
|---|---|---|
| 1 | 4 | 91 |
| 1 | 3 | 89 |
| 1 | 2 | 86 |
| 1 | 1 | 80 |
| 3 | 2 | 77 |
| 2 | 1 | 75 |
| 3 | 1 | 73 |
| 4 | 1 | 72 |

As indicated by these calculations, the higher the mole ratio of the aluminum compound to the acetylenic or allenic compound, the sooner the crosslinking is likely to occur as the reaction proceeds. When a mole of a monoacetylenic compound, having an ethylenic group also included therein, such as vinyl acetylene, is reacted with a mole of aluminum hydride compound, $AlR_3$, the value for P approaches 67%, whereas when a diacetylenic compound, such as phenylene diacetylene, is used, the gellation value P approximates 57%.

It is generally desirable to use proportions of the reactants in accordance with the properties desired in the polymer products. For example, if low molecular weight products are desired, molar proportions of the acetylenic or allenic compound in excess of the theoretical proportions favors this. Where high proportions of the metal are desired in the product, or where a high degree of crosslinking is desired, this is favored by use of excess metal compound and also by the use of compounds having a greater number of unsaturated groups therein. High proportions of metal in the product are also favored by the use of low molecular weight acetylenic and allenic compounds.

When it is desired to prepare a thermoplastic resin according to the practice of this invention, either for use as such or for mixture with other materials, or intermediate treatment prior to conversion to an infusible resin, it is advantageous to use an aluminum compound having one hydrocarbon group per aluminum atom. However, thermoplastic resins can also be prepared by controlling the reaction conditions when unsubstituted aluminum hydrides are used, or when aluminum compounds are used having more than one hydrocarbon substituent per aluminum atom. The preparation of thermoplastic resins can also be facilitated by the use of limited amounts of monoalkenyl compounds which will replace some of the hydrogen on aluminum hydrides and thereby retard crosslinking until desired, at which time higher temperatures can be used to replace such alkyl groups with the acetylenic or allenic compound. Thus, when it is desired to control the molecular weight of a linear polymer, or to put terminal hydrocarbon groups on a polymer chain, this can be accomplished by using a mono-olefin, such as ethylene, together with the polyalkenyl compound. The latter can also be effected by using a tri-substituted aluminum, alone or together with an unsubstituted or mono-substituted aluminum hydride.

Some control over the type and extent of reaction can be effected by using aluminum hydride compounds having hydrocarbon groups of different sizes. It is sometimes desirable, also, that the hydrocarbon group to be replaced by the acetylenic or allenic compound is of a smaller size than the acetylenic or allenic compound. This is particularly desirable where there is a displaced hydrocarbon group escaping as a byproduct olefin. In such cases a dialkenyl compound of higher boiling point than the resultant olefin permits escape of the olefin upon refluxing of the acetylenic or allenic compound, or upon maintaining the reaction temperature below that at which the acetylenic or allenic compound vaporizes to an undesirable extent. In some cases, particularly where the difference in volatility is not great, the olefin can be permitted to escape in a stream of the acetylenic or allenic compound passing through the system, or in a stream of inert gas with additional acetylenic or allenic compound being fed to the system. In cases where the acetylenic or allenic compound has a higher vapor pressure than any olefin that might be given off as byproduct, a closed system can advantageously be used to favor the desired displacement.

The temperature conditions for the promotion of polymer formation in accordance with the practice of this invention vary in accordance with the reactivity of the reagents being used. When an aluminum hydride is being reacted with an acetylenic or allenic compound, a temperature in the range of 70–80° C. is generally suitable. When aluminum hydride compounds containing both hydrogen and hydrocarbon groups are used, the reaction can be controlled mainly to displace the hydrogen by keeping the temperature below 100° C. When hydrocarbon groups are to be displaced from an aluminum hydride compound, a temperature of about 100°–120° C. is preferred. Depending upon the decomposition temperature of the particular reagent and the polymeric product, it is generally advantageous not to exceed a temperature of about 140° C. Temperatures lower than those indicated above can also be used, but longer reaction times are then required. When a mixture of an aluminum hydride and an aluminum hydride compound containing hydrocarbon groups is being used, it is generally desirable to maintain the appropriate temperature until most of the hydrogen has been displaced and then to raise the temperature to that more suitable for displacement of the hydrocarbon group. In some cases the temperature control can be facilitated by the use of an inert solvent, such as heptane, octane, benzene, toluene, xylene, etc., whose boiling point is close to the desired temperature.

The time required for polymer formation varies in accordance with the reactivity of the unsaturated groups in the acetylenic or allenic compound, the type of group to be displaced in the aluminum hydride compound, the temperature being used, and various other factors which would favor the reaction, such as the removal of the by-product olefin, etc. With respect to the last condition, an increase in concentration of such byproduct olefin promotes an equilibrium which competes with the progress of the polymer formation. Therefore, unless the olefin is permitted to escape, or it is absorbed by addition, this tends to slow down the polymerization. The polymerization proceeds most rapidly with terminal acetylenic or allenic groups. Acetylenic and allenic compounds having hydrocarbon groups attached to both ends of the unsaturated group are less reactive than those having terminal unsaturation, and require longer reaction time even at the more favorable temperature conditions. The time will also vary in accordance with the degree of polymerization required. While the more active reagents can give polymers in even less time, many of the polymeric products of this invention can be produced at moderate temperatures in a matter of 12 to 48 hours. In some cases, such as, with the less reactive type of acetylenic or allenic groups, or when low temperatures, for example, 50° C. or lower, are used, much longer reaction periods are desirable. In such cases, the reaction is continued until a solid product is obtained.

By the practice of this invention, a wide range of aluminum-modified polymers can be made by varying the ratio of the aluminum compound to the acetylenic or allenic compound, and thereafter effecting addition polymerization with alkenyl compounds, especially when the alkenyl compounds contain active polymerizable vinyl or vinylidene groups; for example, if one mode of $AlR_3$, e.g., $Al(C_2H_5)_3$, is reacted with three moles of an active acetylenic or allenic compound, e.g. acetylene, allene, etc., the compound will react (to some extent initially) as follows:

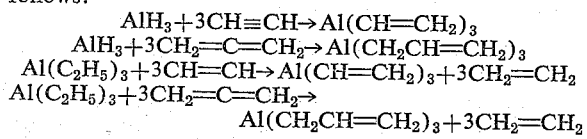

If the reaction is interrupted before gelatin takes place (calculated here at about 89% conversion), and styrene, vinyl phenyl ether, or another polymerizable monomer is added, modified polymers containing various amounts of aluminum can be prepared with different degrees of crosslinkages and heat resistance. Also, before gelation, an oxidizing agent, particularly a solid oxidizing agent, can be added to produce fuel compositions of self-sustaining combustion properties.

When a high proportion of metal is desired in the ultimate product, it is preferred that the acetylenic or allenic compound be of relatively low molecular weight, generally not over 200 or 300.

Typical acetylenic and allenic compounds that can be used in the practice of this invention include, but are not limited to the following: acetylene, methyl acetylene, ethyl acetylene, propyl acetylene, amyl acetylene, vinyl acetylene, diacetylene (butadiyne), dipropargyl (hexadiyne-1,5), hexadiyne-2,4, allene, butadiene-1,2,4-methyl-pentadiene-1,2, tetramethyl allene, phenyl acetylene, phenylene diacetylene, para-vinyl phenyl acetylene, naphthyl acetylene, cyclohexyl acetylene, cyclopentyl acetylene, naphthyene diacetylene, cyclohexylene diacetylene, dipropargyl benzene, dipropargyl naphthalene, dipropargyl cyclohexane, p-propargyl styrene, etc.

Compositions of this invention are also prepared from polymeric hydrocarbon materials containing a plurality of unsaturated groups therein, such as ethylenic and acetylenic groups, by reaction with the metal compounds. The polymeric materials used in the preparation of these compositions have a molecular weight of at least about 500, advantageously above 1,000, and have an average of at least four unsaturated groups per polymer molecule, advantageously more than ten such groups per polymer molecule.

The polymeric starting materials include polymers of polyunsaturated hydrocarbon monomers in which substantially only one of the unsaturated groups has been reacted in forming the polymer, and a substantial amount of the other unsaturated group or groups remains unreacated. While insoluble polymers can be surface reacted by wetting or swelling with reagent, the polymers are advantageously soluble in solvents such as heptane, toluene, benzene, ether, etc., inert to the metal compounds. Polymers having pendant groups, such as vinyl or vinylidene groups or terminal acetylenic groups therein, such as in 1,2-polybutadiene types of polymers, are preferred in the practice of this invention, since they react more easily with the metal compounds, but it is also possible to use polymers having ethylenic groups other than vinyl and vinylidene groups, and acetylenic groups other than terminal ones. In such cases, the reaction with the metal compound can be completed satisfactorily by the application of higher temperatures, or longer reaction periods than are generally required with the vinyl, vinylidene, or terminal acetylinic groups. Methods of polymer preparation which favor the production of pendant types of unsaturated groups and methods of determining relative percentages of such groups are well known in the art. Typical unsaturated polymeric materials include uncured polymers and copolymers of butadiene, isoprene, divinyl benzene, 2,3-dimethyl butadiene, uncured natural rubber, ethylene-acetylene copolymers, etc., as listed above for the formula $R_2C=CR-Z-CR=CR_2$.

Polymers having pendant vinyl, vinylidene, or terminal acetylenic groups, particularly useful in the practice of this invention, are those having repeating units, such as the following typical types:

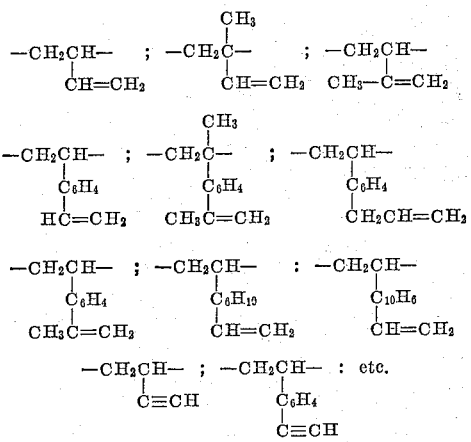

Typical polymeric starting materials having ethylenic or acetylenic groups not of the terminal type include those having repeating units of the following types:

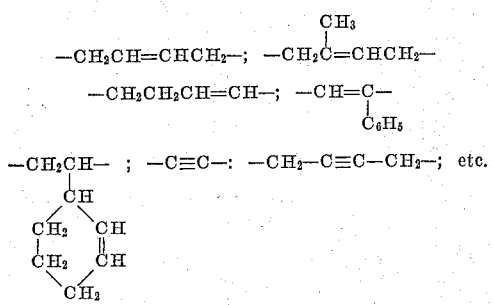

It is not intended that the invention be limited to any particular theory or to any particular formula. It is believed, however, that when a polyunsaturated polymer is used which has pendant groups of the formula

and an aluminum hydride or substituted aluminum hydride is represented by the formula $AlR_3$, then the reaction at the section of the polymer to which the aluminum becomes attached can generally be represented as:

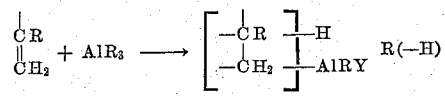

where R is hydrogen or a hydrocarbon radical and Y represents R or a bond to another polymer molecule.

When the polymeric starting material has pendant acetylenic groups, it is believed that the reaction can be represented as:

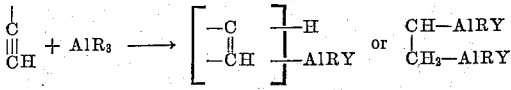

Where the polymeric starting material has ethylenic or actyelenic unsaturation in the linear chain which can be represented as $-CR=CR-$ or $-C\equiv C-$, respectively, it is believed that that part of the polymer to which the aluminium has become attached can generally be represented by the formula:

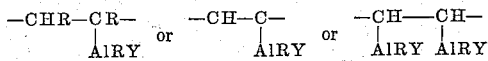

It is possible, however, that the aluminum might actually migrate to a carbon atom other than one actually contained in the unsaturated group in order to form a more stable bond. Therefore, the aluminum may actually be located elsewhere on the polymer chain, or on a side branch such as one of the R's attached to the carbons of the unsaturated group. For that reason, the actual point of attachment of the aluminum group will depend on the particular structure of the polymer being used.

In the preparation of the polymers of this invention, it is often advantageous to catalyze the addition reaction by the use of inorganic ethers, such as diethyl ether, diisopropyl ether, tetrahydrofurane, diglyme, etc. Traces of the ether will catalyze the reaction and unless the ether is to be used also as a solvent or diluent, there is generally no need to have more than about 5 percent ether present. Unsaturated ethers can also be used for this purpose, as well as modifiers in the addition reaction.

Typical unsaturated ethers suitable for this purpose include vinyl ethyl ether, vinyl butyl ether, vinyl propyl ether, vinyl amyl ether, vinyl cyclohexyl ether, vinyl phenyl ether, vinyl tolyl ether, isopropenyl ethyl ether, isopropenyl isopropyl ether, isopropenyl butyl ether, isopropenyl ether, isopropenyl amyl ether, isobutenyl ethyl ether, allyl methyl ether, allyl ethyl ether, allyl propyl ether, butenyl ethyl ether, butenyl propyl ether, pentenyl amyl ether, vinyl cyclohexyl ether, vinyl cyclopentyl ether, para-vinyl anisole, allyl benzyl ether, vinyl benzyl ether, vinyl phenethyl ether, isopropenyl phenethyl ether, etc. The corresponding polyunsaturated ethers, such as divinyl ether, diallyl ether, vinyloxy styrene, etc., can also be used as catalysts as well as modifiers. The unsaturated ethers can be added directly to the reaction mixture as such, or can be reacted with some of the metal compounds prior to the addition, and the resultant product added to the reaction mixture. The use of a catalyst permits the reaction to be effected at lower temperatures and in shorter periods than otherwise possible. In the absence of a catalyst, the reaction can be effected by the use of higher temperatures and longer reaction periods.

The optimum conditions for promoting the addition of the metal compounds to produce the polymeric compositions of this invention depend upon the type of reagents being used. For example, the terminal or pendant types of unsaturated groups, such as vinyl, vinylidene, or terminal acetylenic groups, require lower temperatures and shorter heating periods than are required in the case of unsaturated groups having substituents at both ends of the unsaturated group. Furthermore, the type of metal compound also influences the rate and degree of addition. For example, the unsubstituted hydrides react more easily and at lower temperatures than the substituted derivatives. The partially substituted hydrides react more easily and at lower temperatures than do the fully substituted derivatives. Likewise, the size of the substituents also has an influence on the ease and speed of reaction.

These differences in the ease and speed of reaction, however, are used to advantage in many cases since it permits better control over the rate and type of addition and the rate and degree of crosslinking. It is generally desirable to have a high percentage of the metal compound in the polymer molecules before enough crosslinking of polymer molecules is effected to slow down the addition reaction. For that reason, it is sometimes advantageous to use partially substituted metal hydrides or completely substituted metal compounds having hydrocarbon groups of different size or reactivity. It is also advantageous to have the hydrocarbon substituent groups of such a size and type that will produce volatile byproducts which are easily removed from the reaction medium. In some cases, too, it is also desirable to have the hydrocarbon substituent group of such a type as to give off an olefinic byproduct having strong addition polymerization tendencies, and thereby permit copolymerization of the byproduct with the metallo-addition product.

It is generally suitable to use temperatures in the range of 50–80° C. to permit the addition of the unsubstituted hydrides to the unsaturated groups. Temperatures in the range of 80–100° C. are generally suitable to promote reaction of the partially substituted hydrides, and temperatures in the range of 100–140° C. are generally suitable for the fully substituted metal compounds. It is generally desirable to complete replacement of the hydrocarbon substituents from partially substituted metal compounds by subsequently taking the temperature into the highest temperature range. Lower temperatures than indicated can also be used for the respective additions provided longer reaction periods are used.

When it is desired to control the addition so as to delay crosslinking until after there has been a high degree of addition of the metal compound to the unsaturated groups, it is advantageous to use a temperature which will give a reasonable rate of addition but not rapid enough to promote the further addition required for crosslinking. It can be seen, therefore, that slower rates of addition generally favor a high degree of addition before crosslinking is effected. A high degree of addition before crosslinking is also favored by the use of partially substituted metal hydrides and the use of temperatures in the lower part of the intermediate temperature range indicated above, so as to favor reaction with the hydrogen rather than substitution for the hydrocarbon substituents. Then when a high degree of addition has been effected, the temperature is advantageously raised to promote replacement of the hydrocarbon substituents and thereby effect crosslinking. Similarly, this can be accomplished with compounds having hydrocarbon substituents of different ease of reactivity. Even with completely substituted metal compounds having the same hydrocarbons substituents, it is quite conveniently possible to control the addition reaction so as to obtain a high degree of addition before crosslinking. This is probably due to the fact that higher temperatures are required to replace the alkyl groups and, therefore, the reaction can be more easily controlled. Therefore, in view of this ease of control and the greater facility in preparing and handling the completely substituted metal derivatives, these are preferred in the practice of the invention.

The percentage of metal in the polymeric products of this invention depend on various factors, such as the number of unsaturated groups in the polymeric starting material, the degree of metal addition before crosslinking, the type of substituent groups on the metal compound, the amount of modifiers used, etc. For example, a polymeric starting material having a high number of unsaturated groups per unit weight of polymer permits the introduction of a larger percentage of metal than is permitted by a polymer having a much smaller number of unsaturated groups per unit weight. Therefore, the greater number of unsaturated groups per unit weight of polymer, the greater will be the percentage of metal that can be introduced into the polymer.

Since the type of unsaturated group influences the ease of addition of the metal compounds, this very often affects the amount of metal that can be introduced. Likewise, the temperature and other conditions affecting the ease of addition before sufficient crosslinking is effected to retard further addition, also has an effect on the amount of metal that can be added. While smaller percentages can be incorporated in accordance with the purpose for which the product is desired, for example as little as 0.1 percent or less, it is generally desired for fuel purposes that the polymeric product contain at least about 4 percent metal and up to about 30 percent, or even more.

Various modifiers can be used in the reaction mixture. Such modifiers include those which react simultaneously with the metal compounds, in which case sufficient metal compound should be used to react with both the polyunsaturated polymeric material, and the reactive modifier. Such modifiers include mono- and poly-alkenyl hydrocarbons and ethers, as well as alkenyl compounds of other metals. The nonreactive type of modifiers would include those which are incorporated to modify the properties of the polymeric product, for example, to make them more stable or more suitable for their ultimate purpose, as well as those which are incorporated for subsequent reaction. This latter type of modifier includes the solid and liquid oxidants which can be incorporated when the polymeric product is to be used for fuel purposes. These oxidants can be either of a supplementary or self-sustaining type for the subsequent oxidation. The various modifiers are listed hereinafter.

In cases where the metal compound is gaseous or volatile, the reaction can advantageously be carried out by dissolving the polymeric starting material in an ether or hydrocarbon solvent, such as diethyl ether, diisopropyl ether, tetrahydrofurane, diglyme, hexane, heptane, benzene, toluene, xylene, etc., and passing the metal compound into the reaction solution maintained at the desired temperature and in an inert atmosphere, such as nitrogen. Obviously, a solvent will be selected whose reflux temperature will be appropriate for the desired reaction conditions. As the polymeric product becomes sufficiently crosslinked, or substituted, it precipitates out of the solution. After a sufficient amount of the polymer has been precipitated, the solution can be decantered therefrom and after the residual solvent has been evaporated from the precipitated polymer, heating is continued at a higher temperature under an inert atmosphere. If desired, the solvent can be vaporized directly from the reaction mixture so as to precipitate the polymeric material in solution, and heating of the polymeric product can then be continued at the appropriate temperature.

Various methods of practicing the invention are illustrated by the following examples. These examples are intended merely to illustrate the invention and not in any sense to limit the manner in which the invention can be practiced. The parts and percentages recited therein, and also in the specification, unless specifically provided otherwise, refer to parts by weight and percentages by weight. Unless indicated otherwise, the terms "polymer" and "polymeric" are intended to include "copolymers" and "copolymeric."

EXAMPLE I

A mixture of ten parts triethyl aluminum dissolved in ten parts of heptane is added to three parts of a mixture containing 50 percent divinyl benzene and 50 percent ethyl styrene, and is heated in an atmosphere of nitrogen to boil off the heptane. The temperature is raised to 100° C. and maintained there. Ethylene is gradually evolved from the reaction mixture. After heating for 48 hours the reaction mixture is a solid mass. The product is washed with heptane to remove traces of unreacted triethyl aluminum. The washed product is stable in air in contrast to the aluminum alkyls which oxidize and burn in air. The product is ground with an equal weight of ammonium perchlorate. The resultant mixture when ignited and tested according to known tests for propellant thrust, shows excellent thrust properties.

EXAMPLE II

Two parts of triethyl aluminum and ten parts of a mixture containing 50 percent divinyl benzene and 50 percent ethyl styrene, are mixed and heated in an atmosphere of nitrogen at 120° C. for 15 hours. A solid, glasslike polymeric mass is formed. The product is ground and washed with heptane and dried. The product does not melt at 200° C., nor spontaneously combust at this temperature. In three different tests, four parts of this polymer are ground individually with six parts of ammonium perchlorate, lithium perchlorate, and potassium perchlorate, respectively. In each case the mixture, when ignited, burns very rapidly with an intense white flame and upon testing for thrust properties, according to known tests for such purpose, the product shows excellent thrust.

EXAMPLE III

Various mixtures of triethyl aluminum and divinyl benzene are heated under an atmosphere of nitrogen at a temperature of 120° C. In each case the mixture contains 11.4 parts of triethyl aluminum, and with each experiment a progressively smaller amount of divinyl benzene, as follows: 52, 39, 26, 13, 8.7, 6.5, 4.3, and 3.2 parts respectively. In each case a solid product is obtained, as in Example II, but the time required for the formation of the cake is progressively decreased as lower amounts of divinyl benzene are used. In each case the product shows burning properties similar to the product of Example II, and shows excellent thrust properties when burned as such with liquid oxygen in accordance with known tests for propellant thrust.

EXAMPLE IV

The procedure of Example II is repeated, using 16.4 parts of diallyl, and 15.6 parts of tripropyl aluminum, and sealing the mixture under vacuum in a glass tube. The resultant solid product shows similar burning and thrust properties as for the products of Example II.

When the above procedure is repeated, using an equivalent amount of hexadiene-2,4, in place of the diallyl, and an equivalent amount of triamyl aluminum in place of the tripropyl aluminum, and raising the temperature at the end of the heating period to about 135° C. for an additional 10 hours, similar results are obtained.

EXAMPLE V

The procedure of Example II is repeated, with similar results, using in place of the divinyl benzene-ethyl styrene mixture, an amount of divinyl cyclohexane equivalent to the amount of divinyl benzene, in another case an equivalent amount of diallyl cyclohexene, and in the third case an equivalent amount of divinyl cyclohexane.

EXAMPLE VI

A mixture of 58 parts of ethyl aluminum dihydride and 158 parts of diallyl benzene are heated under an atmosphere of nitrogen at a temperature of 80° C. for five hours, and then at a temperature of 120° C. for an additional fifteen hours. The resultant product, after washing, grinding, and mixing with perchlorates, as in Example II, shows excellent burning and thrust properties similar to those of the product of Example II.

EXAMPLE VII

The procedure of the preceding example is repeated using an equivalent amount of diisopropenyl benzene in place of the diallyl benzene. Similar results are obtained.

EXAMPLE VIII

Six parts of aluminum diethyl hydride are heated in an atmosphere of nitrogen to 90° to 95° C., and a stream of butadiene is passed through at a rate of about 3 grams per hour for a period of 15 hours. Then the butadiene stream is cut off and the temperature raised to 125–130° C., and maintained under an atmosphere of nitrogen for an additional 24 hours. The resultant solid product, upon treatment and testing as in Example I, shows excellent burning and thrust properties.

EXAMPLE IX

The procedure of the preceding example is repeated using an equivalent amount of ethyl aluminum dihydride. Similar results are obtained.

Similar results are also obtained when the procedure of Example VIII is repeated using isoprene, in place of butadiene, in one case, and in another case using isoprene and an equivalent amount of ethyl aluminum dihydride in place of the aluminum diethyl hydride.

EXAMPLE X

The following procedure is followed a number of times, using in each case a different mixture as indicated in Table I below. The number appearing before a particular compound, in this table and in subsequent tables, indicates the number of parts by weight of that compound used. In each case the mixture is maintained under an atmosphere of nitrogen at a temperature of 120° to 130 °C. for a period lasting one hour after the reaction mixture has become a solid mass. In each case, the product is processed as in Example I and upon testing exhibits excellent burning and thrust properties.

Table I

| Aluminum hydride compound: | Polyalkenyl compound |
|---|---|
| 26 triphenyl aluminum | 15 divinyl toluene. |
| 30 tritolyl aluminum | 18 divinyl naphthalene. |
| 40 tristyryl aluminum | 20 divinyl diphenyl. |
| 30 tricyclohexyl aluminum | 15 divinyl cyclohexane. |
| 30 tri-(beta-cyclohexylethyl) aluminum | 20 divinyl benzene. |
| 25 triethyl aluminum | 20 octadiene-1,7. |
| 15 tripropyl aluminum | 15 diisopropenyl benzene. |

EXAMPLE XI

The following procedure is followed a number of times, using in each case a different mixture as indicated in Table II below. In each case the mixture is heated under a nitrogen atmosphere at a temperature of 80° to 90° C. for five hours, then at a temperature of 120° to 130° C. for a period lasting until one hour after the reaction mixture forms a solid mass. The products are processed as in Example I, and each product exhibits excellent burning and thrust properties.

Table II

| Aluminum hydride compound: | Polyalkenyl compound |
|---|---|
| 30 styryl aluminum dihydride | 15 divinyl benzene; 15 ethyl styrene. |
| 25 distyryl aluminum hydride | 20 divinyl naphthalene. |
| 40 diethyl aluminum hydride | 40 octadiene-1,7. |
| 60 ethyl aluminum hydride | 80 diallyl cyclohexane. |
| 70 symmetrical dipropyl dialuane | 120 divinyl benzene. |
| 60 tetraethyl dialuane | 130 divinyl cyclohexane. |

EXAMPLE XII

Various mixtures indicated in Table III below are treated according to the following procedure. The mixture is heated, in each case, under a blanket of nitrogen under reflux, and in accordance with the corresponding increase in reflux temperature, the temperature is gradually increased to 75–80° C. and maintained at that temperature for approximately five hours. Then the temperature is gradually increased to 120–125° C. and maintained in that range until the reaction mixture has formed a solid mass, following which the temperature is raised to 130–135° C. for a period of two hours. The product is processed as in Example I and, in each case, upon testing exhibits excellent burning and thrust properties.

Table III

| Aluminum hydride compound: | Polyalkenyl compound |
| --- | --- |
| 30 aluminum hydride | 60 cyclopentadiene. |
| 15 aluminum hydride; 60 triethyl aluminum | 100 vinyl cyclohexene. |
| 15 aluminum hydride; 40 diethyl aluminum hydride | 80 hexadiene-2,4. |
| 30 aluminum hydride | 80 diallyl. |
| 15 aluminum hydride; 100 tributyl aluminum | 100 dimethallyl. |

EXAMPLE XIII

To a flask equipped with a reflux condenser and nitrogen inlet, is added 1.35 parts of divinyl benzene, 1.35 parts of ethyl styrene, and 10 parts of triisobutyl aluminum dissolved in 10 parts of heptane. The resultant solution is heated under nitrogen for two days at a temperature of 60° C. At the end of this time, the reaction product is a solid, hard mass. This is broken up and ground with ammonium perchlorate in a proportion of 3 parts of ammonium perchlorate per part of reaction product. The resultant mixture burns vigorously upon ignition and shows excellent thrust properties.

EXAMPLE XIV

The procedure of Example XIII is repeated, using 1.5 parts of divinyl benzene, 1.5 parts of ethyl styrene, 3 parts of styrene, 0.2 parts of diethyl ether, and 5 parts of triisobutyl aluminum dissolved in 5 parts of heptane. The reaction mixture is heated to 60° C. for three days. On the fourth day, the temperature is raised to 110° C., whereupon thickening of the reaction mixture occurs. Upon continued heating, a gel forms by the fifth day. By the end of the sixth day, a waxy, light yellow, solid product is obtained. By grinding with ammonium perchlorate in the proportion of 3 parts of ammonium perchlorate per part of reaction product, a mixture is obtained which burns vigorously upon ignition and shows excellent thrust properties.

EXAMPLE XV

A mixture of 12 parts of triethyl aluminum and 18 parts of $B(CH_2CH_2CH=CH_2)_3$ is heated under an atmosphere of methane at 120–125° C. for approximately 48 hours. An insoluble, infusible product is obtained which is believed to have a plurality of repeating units of the structure:

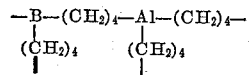

By using equivalent amounts of the corresponding dibutenyl magnesium and dibutenyl beryllium, respectively, in place of the tributenyl borane, and in each case repeating the preceding procedure, two solid products are obtained which are believed to have a plurality of repeating units, in one case of:

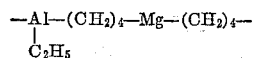

and in the other case of:

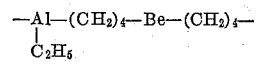

The polymerization described herein can be suspended at an early stage to give low-melting, solid polymers, or in some cases viscous oils, which can be stored as such and the polymerization reaction continued at a subsequent time. In fact, the reaction can be suspended when the product comprises substantially a monomeric product, such as, for example, that derived from an aluminum hydride compound and butadiene, namely:

or

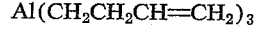

and the polymerization completed later by the application of heat or the addition of aluminum hydride compounds or other reagents, catalysts, modifiers, etc.

Various modifiers can be added to the compositions of this invention after the polymerization is completed, and in cases where the modifiers are non-reactive with the aluminum hydride compounds, can be added prior to the initiation of the polymerization, or at some intermediate stage.

EXAMPLE Ia

A mixture of 20 parts of tri-secondary-butyl aluminum, 1 part dioxane, and 50 parts of heptane is heated in an atmosphere of nitrogen at 50° C. Pure acetylene is bubbled into the solution at such a rate that the temperature does not rise above 55° C. When approximately 3 grams of acetylene has been absorbed, the acetylene supply is shut off and heating continued for an additional two hours. Then the temperature is raised gradually to distill off the heptane, following which the temperature is taken to 120° C. for a period of thirty hours. The product is washed with heptane to extract traces of unconverted tributyl aluminum. The washed product is stable in air in contrast to ordinary organo-aluminums, which oxidize and burn in air. The resultant product is ground with an equal weight of ammonium perchlorate. The resultant mixture when ignited and tested, according to known tests for propellant thrust, shows excellent thrust properties.

EXAMPLE IIa

The procedure of Example Ia is repeated, using 12 parts of triethyl aluminum in place of tri-butyl aluminum, and 4.5 parts of methyl acetylene in place of the acetylene. In three different tests, 4 parts of the resultant polymer are ground individually with 6 parts of ammonium perchlorate, lithium perchlorate, and potassium perchlorate, respectively. In each case, the mixture when ignited burns very rapidly with an intense white flame, and upon testing for thrust properties shows excellent thrust.

EXAMPLE IIIa

The procedure of Example IIa is repeated, except that allene is used in place of the methyl acetylene. Similar results are obtained.

The same procedure used with an equivalent weight of propyl acetylene also gives similar results.

EXAMPLE IVa

The following procedure is repeated eight times, using in each case 20 parts of tri-isobutyl-aluminum, and with each experiment a progressively smaller amount of phenyl acetylene, as follows: 45, 33, 22, 11, 9, 5.5, 3.3, and 2 parts, respectively. In each case, the aluminum compound-phenyl acetylene mixture is prepared at room temperature under an atmosphere of nitrogen and then the temperature is gradually raised to 80° C. and maintained there under the nitrogen atmosphere until the reaction mixture forms a solid cake and no more butene is released from the reaction. The product is washed with heptane to extract traces of unconverted tributyl aluminum. The washed product is ground with an equal weight of ammonium perchlorate. The resultant mixtures when ignited and tested, according to known tests for propellant thrust, show excellent thrust properties.

EXAMPLE Va

The procedure of Example Ia is repeated, using 15.6 parts of tri-isobutyl aluminum, and 4.5 parts of vinyl acetylene. The product shows similar burning and thrust properties.

EXAMPLE VI

To a solution of 33 parts of tri-isobutyl-aluminum in 100 parts of heptane, covered by a blanket of nitrogen, is added 13 parts of phenylene diacetylene. The resultant mixture is heated under an atmosphere of nitrogen and the temperature is raised gradually to remove the heptane by distillation. Then the temperature is maintained in the range of 100°–120° C. for 48 hours. The resultant solid product is washed with heptane, and then ground with an equal weight of ammonium perchlorate. The resultant mixture, when ignited and tested, shows excellent burning and thrust properties.

The above procedure is repeated, using in one case cyclohexene diacetylene, and in another case naphthylene diacetylene in amounts equivalent to and in place of the phenylene diacetylene used in the above procedure. In each case results are obtained similar to those indicated above.

EXAMPLE VIIa

The procedure of Example VIa is repeated, using 50 parts of tri-styryl-aluminum in place of the tri-isobutyl-aluminum. The resultant solid product, when ground with an equal weight of ammonium perchlorate, shows excellent ignition and thrust properties.

EXAMPLE VIIIa

The following procedure is repeated a number of times, using in each case a different mixture selected from those indicated in the table below. The number appearing in the table before a particular compound indicates the number of parts by weight of that compound used. In each case the acetylenic or allenic compound, together with any solvent or modifier, is maintained under an atmosphere of nitrogen at a temperature of 50°–55° C. In the case of vinyl acetylene, it is fed into the heptane solvent at such a rate that it is present in molecular excess to the amount of aluminum hydride present. Any acetylenic or allenic compound lost from the system through volatilization is caught in a low temperature trap and returned to the system. A solution of 30 parts of aluminum hydride in 100 parts of ether is dropped into the reaction mixture while under a blanket of nitrogen, at such a rate that no more than a 5% rise in temperature occurs. When the temperature rises above 60° C., the aluminum hydride solution supply is cut off or reduced until the temperature has subsided to the desired range. During this addition period, the ether is allowed to vaporize from the reaction mass and is recovered by condensation at a point before the low temperature trap mentioned above. After all the solution has been added, the heating is continued for a period of two hours, after which the temperature is raised to the solvent reflux temperature for a period of ten hours, and where no solvent is used a temperature of approximately 80° C. is maintained for that period. Then the solvent is distilled off and the resultant product in each case shows excellent burning and thrust properties.

Table

| Acetylenic or Allenic Compound | Modifier | Solvent or Catalyst |
|---|---|---|
| 110 Phenyl acetylene | | |
| 90 Phenyl acetylene | 5 Divinyl benzene | |
| 120 Cyclohexyl acetylene | | 100 Heptane. |
| 100 Amyl acetylene | | 10 Tetrahydrofurane; 90 Heptane |
| 30 Vinyl acetylene | 5 Vinyl ethyl ether | 100 Heptane. |
| 75 Phenylene diacetylene | | 100 Heptane. |
| 80 Hexadiene-1,2 | | 100 Cyclohexane. |
| 120 p-Vinyloxy-phenyl acetylene | | Do. |

EXAMPLE IXa

A mixture of 12 parts of triethyl aluminum and 10 parts of phenylacetylene is heated under a nitrogen atmosphere at 80° C. for ten hours. The mixture is then cooled to room temperature, and 10 parts of styrene, and 36 parts of finely ground ammonium perchlorate are added. The mixture is milled to uniformity and then press-cast in the form of a rod and heated at 60°–70° C. for 12 hours. A solid, infusible product is obtained which shows excellent thrust properties.

EXAMPLE Xa

A mixture of 35 parts of tri-styryl-aluminum, 20 parts of amyl-acetylene, and 0.2 parts of para-allyloxy-phenyl-acetylene, is heated at 70° C. in a sealed container for a period of 48 hours. The resultant solid product shows excellent burning and thrust properties.

The above procedure is repeated using 40 parts of phenylacetylene in place of the amylacetylene, and also 80 parts of ammonium nitrate, to produce a solid propellant fuel of excellent thrust.

EXAMPLE XIa

A mixture of 12 parts of triallyl-aluminum and 7 parts of triethyl borane is heated under an atmosphere of methane for 15 hours at 90° C. An insoluble, infusible product is obtained. This polymer is believed to have, at least in part, repeating units of the following structure:

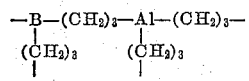

By using equivalent amounts of diethyl magnesium, and diethyl beryllium, respectively, in place of the triethyl borane, and in each case repeating the preceding procedure, two solid products are obtained, which are believed to have, at least in part, repeating units of the following structures:

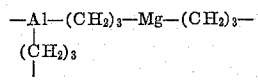

and

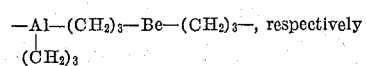

EXAMPLE XIIa

Ten parts of the polymer of Example Ia is mixed uniformly with 40 parts of finely divided ammonium perchlorate in a solution of 9 parts of styrene, one part of a 50/50 commercial divinyl benzene-ethyl styrene mixture, and 0.1 part of benzoyl peroxide. The mixture is cast and maintained at 70° C. for 12 hours. An insoluble, infusible polymer product is obtained, which shows excellent thrust properties.

EXAMPLE XIIIa

A mixture of 44 parts of diethyl aluminum hydride, 1 part diethyl ether, and 100 parts of heptane is prepared and maintained under an atmosphere of nitrogen at 50° C. Pure acetylene is bubbled into the solution at such a rate that the temperature is permitted to rise no more than five degrees, cutting off or reducing the acetylene supply when the temperature rises above 55° C. Volatile reactants escaping from the system are caught in a cold trap and returned to the reaction mixture. When approximately 3 grams of acetylene has been absorbed, the acetylene supply is shut off and the temperature is maintained at 50°–55° C. for an additional 5 hours. Then, the temperature is raised gradually to distill off the heptane, following which the temperature is taken to 80° C. for a period of 35 hours. The solid polymer product, when tested as in Example I$a$, shows excellent burning and thrust properties.

The above procedure is repeated a number of times, with similar results, using in place of the diethyl aluminum hydride, an equivalent weight of:

Dimethyl aluminum hydride
Tetramethyl dialuane
Trimethyl dialuane
Butyl aluminum dihydride
Propyl aluminum dihydride
Styryl aluminum dihydride, respectively.

The polymerization described herein can be suspended at an early stage to give low-melting, solid polymers, or in some cases viscous oils, which can be stored as such and the polymerization reaction continued at a subsequent time. In fact, the reaction can be suspended when the product comprises substantially a monomeric product, such as, for example, that derived from an aluminum hydride compound and allene, namely:

and the polymerization completed later with the addition of additional aluminum hydrides, or other reagents, modifiers, heat, etc.

EXAMPLE I$b$

A solution of 20 parts of tri-secondary-butyl aluminum, 15 parts of solid, soluble polymer of divinyl benzene, and 0.2 parts of diethyl ether in 100 parts of toluene, is heated in an atmosphere of nitrogen at 50° C. for one hour. Then the temperature is raised to 70° C. for two hours, and thereafter refluxed for five hours. The toluene is then distilled off and the reaction mixture heated at 120–130° C. for 24 hours. The solid product is washed with heptane to extract traces of unconverted tributyl aluminum. The washed product is more stable in air than the ordinary organo-aluminum compounds which oxidize and burn in air. The resultant product is ground with an equal weight of ammonium perchlorate. The resultant mixture, when ignited, burns very rapidly with an intense white flame, and when tested according to known tests for propellant thrust, shows excellent thrust properties.

EXAMPLE II$b$

The procedure of Example I$b$ is repeated, using 15 parts of triethyl aluminum, in place of the tributyl aluminum, and 0.2 parts of divinyl ether, instead of the diethyl ether. In three different tests, 4 parts of the resultant polymer are ground individually with 6 parts of ammonium perchlorate, lithium perchlorate, and potassium perchlorate, respectively. In each case, the mixture, when ignited, burns very rapidly with an intense white flame, and upon testing for thrust properties, shows excellent results.

EXAMPLE III$b$

The procedure of Example I$b$ is repeated, except that in place of the divinyl benzene polymer there is used 6 parts of a solid, soluble polymeric butadiene, having approximately 60 percent of 1,2-polybutadiene structure. Similar results are obtained.

EXAMPLE IV$b$

The procedure of Example I$b$ is repeated, except that in place of the divinyl benzene polymer there is used, a solid, soluble butadiene polymer having approximately 10 percent of 1,2-polybutadiene structure, and the final heating is conducted for 60 hours instead of 24. The product shows good burning and thrust properties.

EXAMPLE V$b$

The following procedure is repeated eight times, using in each case 20 parts of tri-isobutyl aluminum, and with each experiment a progressively smaller amount of a solid, soluble polymeric butadiene having approximately 60 percent of 1,2-polybutadiene structure, as follows: 24, 18, 12, 6, 4.5, 3, 2, and 1.5, respectively. In each case, the aluminum compound and the polymer are dissolved in 100 parts of benzene and heated under an atmosphere of nitrogen at 50° C. for a period of two hours, and then refluxed for a period of ten hours. Then the benzene is distilled off and the reaction mixture heated under nitrogen atmosphere at 100–130° C. for 30 hours. The product in each case is treated as in Example I$b$ and shows excellent burning and thrust properties.

EXAMPLE VI$b$

The procedure of Example I$b$ is repeated, using 16 parts of tri-propyl aluminum, 14 parts of solid, soluble polymer of para-allyl-styrene, and 0.3 parts of tri-(allyloxypropyl)aluminum. Similar results are obtained.

EXAMPLE VII$b$

The procedure of Example VI$b$ is repeated, using 15 parts of tri-styryl aluminum and 15 parts of a solid, soluble polymer of para-isopropenyl-styrene. The product shows excellent burning and thrust properties.

EXAMPLE VIII$b$

The procedure of Example VII$b$ is repeated, using 15 parts of a solid, soluble polymer of para-vinyloxy styrene, in place of the para-isopropenyl-styrene, and omitting the tri-(allyloxypropyl)aluminum. The product shows excellent burning and thrust properties.

EXAMPLE IX$b$

The procedure of Example VIII$b$ is repeated, using 16 parts of a solid, soluble polymer of para-allyloxy-styrene, in place of the vinyloxy-styrene. The product shows similar burning and thrust properties.

EXAMPLE X$b$

The following procedure is repeated eight times, using in each case a different mixture of soluble polymer and modifier or catalyst, selected from those indicated in the table below. The number appearing in the table before a particular compound indicates the number of parts by weight of that compound used. In each case the polyunsaturated polymer dissolved in 100 parts of benzene, together with any catalyst or modifier, is maintained under an atmosphere of nitrogen at a temperature of 50–55° C. A solution of 30 parts of aluminum hydride in 100 parts of ether is dropped into the reaction mixture covered by a blanket of nitrogen, at such a rate that no more than a 5 percent rise in temperature occurs. When the temperature rises above 60° C. the aluminum hydride solution supply is cut off or reduced until the temperature has subsided to the desired range. During this addition period, the ether is allowed to vaporize from the reaction mass. After all the solution has been added, the heating is continued for a period of two hours, after which the temperature is raised to the solvent reflux temperature for a period of ten hours. Then the solvent is distilled off and heating continued at 90° C. for an additional 15 hours. The resultant product in each case shows excellent burning and thrust properties.

Table Ib

| Polyunsaturated polymer of— | Modifier or catalyst |
|---|---|
| 100 3-vinyl cyclohexene | 5 diallyl ether. |
| 60 ethylene-acetylene copolymer (75–25 mole ratio) | |
| 70 isoprene | 5 allyl propyl ether. |
| 70 p-vinyl phenylacetylene | 10 styrene. |
| 100 diallyl ether | |
| 120 divinyl benzene - divinyl ether copolymer (80–20 mole ratio) | |
| 160 p-vinyloxy-styrene | |
| 80 uncured natural rubber | 10 diallyl ether. |

EXAMPLE XIb

Six experiments are performed, using in each case a different solution of the aluminum compound, soluble polymer, and catalyst or modifier, dissolved in 150 parts of benzene, selected from Table II below, and heated under an atmosphere of nitrogen at 50° C. for one hour, then 70° C. for two hours, then refluxed for five hours, following which the benzene is distilled off and the reaction mixture heated at 100° C. for 48 hours. Excellent burning and thrust properties are exhibited by each product when tested according to Example Ib.

Table IIb

| Aluminum Compound | Polymer of— | Catalyst or Modifier |
|---|---|---|
| 80 Diethyl aluminum hydride. | 55 Butadiene. | 5 Vinyl ethyl ether. |
| 110 Dibutyl aluminum hydride. | 70 Butadiene-styrene copolymer (75–25 weight ratio). | 2 Tetrahydrofuran. |
| 120 Styryl aluminum hydride. | 55 Ethylene-acetylene copolymer (75–25 mole ratio). | 5 Divinyl ether. |
| 45 Tetramethyl diborane. | 265 Divinyl benzene-ethyl styrene copolymer (50–50 weight ratio). | 2 Diethyl ether. |
| 20 Ethyl aluminum dihydride. | 150 p-Allyloxystyrene. | 10 Styrene. |
| 75 Propyl aluminum dihydride. | 50 Vinyl acetylene. | 2 Diethyl ether. |

EXAMPLE XIIb

A solid, soluble polymer of divinyl benzene (130 parts) is mixed under a nitrogen atmosphere with 80 parts tripropyl aluminum on a Banbury mixer. The resultant mixture is heated under nitrogen at 80° C. for 72 hours. The resultant product, when tested according to Example I, shows excellent burning and thrust properties.

EXAMPLE XIIIb

The procedure of Example XIIb is repeated using 105 parts of tripropyl aluminum and 30 parts of styrene, in place of the 80 parts of tripropyl aluminum of Example XIIb. Similar results are obtained.

EXAMPLE XIVb

The procedure of Example XIIb is repeated with similar results using 200 parts of tributyl aluminum in place of the tripropyl aluminum.

EXAMPLE XVb

The procedure of Example XIIb is repeated using in place of the tripropyl aluminum, 320 parts of tristyryl aluminum, and 90 parts of tributenyl boron. An insoluble, infusible product is obtained, which has excellent burning and thrust properties. This product has both aluminum and boron in the polymeric molecules.

By using equivalent amounts of dibutenyl magnesium and dibutenyl beryllium, respectively, in place of the tributenyl boron, and in each case repeating the preceding procedure, two solid products are obtained having similar burning and thrust properties. These polymeric products have aluminum and magnesium in the polymeric molecules of one, and aluminum and beryllium in the polymeric molecules of the other product.

EXAMPLE XVIb

Ten parts of the polymer of Example Ib is mixed uniformly with 40 parts of finely divided ammonium perchlorate in a solution of 9 parts of styrene, one part of a 50–50 commercial divinyl benzene-ethyl styrene mixture, and 0.1 part of benzoyl peroxide. The mixture is cast and maintained at 60° C. for 12 hours. An insoluble, infusible polymer product is obtained, which shows excellent burning and thrust properties.

EXAMPLE XVIIb

The procedure of Example XIIb is repeated using 200 parts of tributenyl aluminum in place of the tripropyl aluminum. The product shows excellent burning and thrust properties when tested as in Example Ib.

Typical unsaturated compounds that can be used for preparing polymers and copolymers having unsaturation therein suitable for preparing the compositions of this invention include, but are not limited to the compounds listed above as having the formula $R_2C=CR-Z-CR=CR_2$.

As modifiers in the preparation of polymers, according to the practice of this invention, various mono- and polyalkenyl types of boron, beryllium, and magnesium compounds can be added before or during the polymerization. By substitution of such alkenyl compounds for remaining hydrogen or saturated hydrocarbon groups on the aluminum hydride compounds, or by reaction with compounds which have already partially reacted with aluminum, both aluminum and boron, beryllium, or magnesium can be incorporated in polymeric compositions.

Such modifiers include those formed by the addition of boron, beryllium, and magnesium hydrides and their hydrocarbon-substituted and unsaturated ether derivatives, such as methyl dibutenyl boron, tributenyl boron, methyl diallyl boron, di(vinyloxyethyl)beryllium, diallyl beryllium, dibutenyl beryllium, ethyl butenyl magnesium, diallyl magnesium, dibutenyl magnesium, bis-(p-vinylphenethyl)-magnesium, methyl bis-(p-vinyl-phenethyl)-boron, etc.

Various other modifiers can be added, either prior to the initiation of the addition reaction, at some intermediate stage, or after the reaction is completed. Such modifiers include various other resins, such as: polystyrene, polyethylene, polypropylene, polybutenes, paraffins, polyvinyl ethers, such as polymeric vinyl ethyl ether, polymeric vinyl butyl ether, etc. Certain other resins containing ester, amide, or other groups that may be reduced or reacted upon by the metal compounds can be added after the boron polymers are formed. However, if sufficient metal compound is added to compensate for that used in such side reactions, such resins can also be added before or during the reaction. Such resins include: polyesters, such as polyvinyl acetate, polyvinyl propionate, polyvinyl butyrate, polymethyl methacrylate, polymethyl acrylate, etc., polyvinyl acetal, polyvinyl butyral, etc., polyacrylonitrile, polyamides, such as nylon and polymeric caprolactam, etc.

Various other unsaturated compounds can also be added, either before initiation of the addition reaction, at an intermediate stage, or at the completion of the reaction, to modify the properties of the products. With regard to esters, etc., reactive with the metal hydrides or derivatives, the same comments apply as made above with respect to resins having ester groups, etc. Such unsaturated compounds include: polyunsaturated hydrocarbons, polyunsaturated esters, polyunsaturated ethers, polyunsaturated ether-esters, and various corresponding monounsaturated compounds.

Typical examples of such unsaturated compounds include, but are not restricted to, the following: 1,3-butadiene, isoprene, 2,3-dimethyl butadiene, pentadiene-1,3, hexadiene-2,4, octadiene-2,4, hexatriene-1,3,5, 2-phenylbutadiene, 1,3-pentadiene, hexadiene-1,5, 2,4-dimethyl-pentadiene-1,4, vinyl cyclohexene, 1-phenyl-pentadiene-1,3-divinyl cyclohexane, diallyl, 1,6-heptadiene, 1,8-nonadiene, 2,8-decadiene, 2,9-dimethyl-2,8-decadiene, divinyl cyclopentane, divinyl methyl cyclohexane, dipentenyl cyclohexane, allyl cyclohexene, diallyl cyclohexene, divinyl cyclohexene, (beta-vinylalkyl)-furane, (beta-allyl-ethyl)-furane, diallyl cyclohexane, diallyl cyclopentane, dibutenyl cyclohexane, 1,7-diphenyl-heptadiene-1,6, 2,7-diphenyl-octadiene-1,7, divinyl benzene, trivinyl benzene, divinyl naphthalene, trivinyl naphthalene, divinyl diphenyl, trivinyl diphenyl, divinyl toluene, trivinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyl diphenyl, divinyl ethoxy naphthalene, divinyl chloronaphthalene, divinyl chlorodiphenyl, divinyl ethoxy diphenyl, vinyl isopropenyl benzene, vinyl isopropenyl naphthalene, vinyl isopropenyl diphenyl, vinyl isopropenyl toluene, vinyl isopropenyl anisole, vinyl isopropenyl chlorobenzene, vinyl isopropenyl methoxy naphthalene, vinyl isopropenyl chloronaphthalene, vinyl isopropenyl methyl chloronaphthalene, vinyl isopropenyl chlorodiphenyl, vinyl isopropenyl methoxy diphenyl, vinyl isobutenyl benzene, vinyl isobutenyl naphthalene, vinyl isobutenyl diphenyl, vinyl allyl benzene, vinyl allyl naphthalene, vinyl allyl diphenyl, vinyl allyl toluene, vinyl allyl anisole, vinyl allyl methyl naphthalene, vinyl allyl chlorodiphenyl, diallyl benzene, triallyl diphenyl, diallyl toluene, diallyl xylene, diallyl chlorobenzene, diisopropenyl benzene, diisopropenyl naphthalene, diisopropenyl diphenyl, diisopropenyl toluene, diisopropenyl anisole, diisopropenyl methyl naphthalene, diisopropenyl chlorodiphenyl, dimethallyl benzene, dimethallyl naphthalene, dimethallyl diphenyl, bis-(alpha-ethyl-ethenyl)-benzene, bis-(alpha - vinyl - ethyl)-benzene, bis-(alpha-vinyl-ethyl)-naphthalene, bis-(alpha-vinyl - ethyl) - diphenyl, vinyl(alpha-vinyl-ethyl)-benzene, vinyl(alpha-vinyl-ethyl)-naphthalene, vinyl(alpha - vinyl-ethyl)-diphenyl, dipropenyl benzene, p-propenyl styrene, para-propenyl isopropenyl-benzene, dicrotyl benzene, dicrotyl naphthalene, dicrotyl diphenyl, dicrotyl anisole, dicrotyl xylene, bis-(4-vinyl - n - butyl)-benzene, bis-(5-isopropenyl-n-hexyl)-benzene, bis - (5-isopropenyl-n-hexyl)-diphenyl, bis-(5-methyl-hepten - 5 - yl) - benzene, bis-(5-methyl-nonen-6-yl)-diphenyl, bis-(n-decen-5-yl)-toluene, dicyclopentenyl-naphthalene, di-cyclohexenyl-benzene, divinyl ether, diallyl ether, vinyl allyl ether, propenyl vinyl ether, propenyl allyl ether, divinyl ether of resorcinol, divinyl ether of ethylene glycol, diisopropenyl ether, isopropenyl vinyl ether, isopropenyl allyl ether, isopropenyl butenyl ether, isopropenyl isoamylene ether, diallyl ether of resorcinol, diisobutenyl ether of hydroquinone, para-vinyloxy styrene, para allyloxy styrene, triallyloxy benzene, tripropenyloxy benzene, allyl acrylate, allyl methacrylate, vinyl acrylate, vinyl methacrylate, isopropenyl acrylate, isopropenyl methacrylate, butenyl acrylate, butenyl methacrylate, vinyl crotonate, allyl crotonate, isopropenyl crotonate, propenyl crotonate, isobutenyl crotonate, ethylene glycol diacrylate, trimethylene glycol diacrylate, tetramethylene glycol diacrylate, pentamethylene glycol dimethacrylate, divinyl phthalate, diallyl phthalate, diisopropenyl phthalate, dibutenyl phthalate, divinyl diphenyl-dicarboxylate, diallyl naphthalene-dicarboxylate, diallyl itaconate, divinyl itaconate, divinyl maleate, diallyl succinate, diisopropenyl succinate, dibutenyl succinate, divinyl succinate, diallyl adipate, divinyl adipate, diallyl azelate, divinyl azelate, diisopropenyl suberate, divinyl pimelate, diallyl glutarate, diisopropenyl glutarate, divinyl sebacate, diallyl sebacate, diallyl japanate, divinyl octadecanedioate, vinyl 11 - acryloxy-undecanoate, allyl 11-methacryloxy undecanoate, isopropenyl 5-crotonoxy-caproate, vinyl 4-acryloxy-caproate, vinyl 11-vinyloxy-undecanoate, allyl 11-allyloxy-undecanoate, vinyl 11-allyloxy-undecanoate, isopropenyl 11-isopropenyloxy-undecanoate, vinyl 5-vinyloxy-caproate, vinyl 5-crotyloxy-caproate, vinyl 5-allyloxy-caproate, allyl 5-allyloxy-caproate, isopropenyl 5-isopropenyloxy-caproate, vinyloxy-tetramethylene acrylate, allyloxy-hexamethylene methacrylate, allyloxy-octamethylene crotonate, isopropenyloxy-octamethylene acrylate, crotyloxy-hexamethylene methacrylate, ethyl diallylnaphthalene, propyl dibutenyl benzene, butyl dibutenyl benzene, ethylene, propylene, butene-1, butene-2, hexene-1, hexene-2, t-butylethylene, 2,4,4-trimethyl-1-pentene, 2,4,4-trimethyl-pentene-2, cyclopentene, cyclohexene, styrene, 1,1-diphenyl ethylene, vinyl cyclohexane, alpha-methyl-styrene, vinyl naphthalene, beta-methyl styrene, allyl benzene, allyl cyclohexane, decene-1, decene-2, decene-3, decene-4, decene-5, dodecene-1, dodecene-2, tetradecene-1, hexadecene-1, cyclopentene, vinyl methyl ether, vinyl ethyl ether, vinyl butyl ether, vinyl propyl ether, vinyl amyl ether, vinyl cyclohexyl ether, vinyl phenyl ether, vinyl tolyl ether, isopropenyl methyl ether, isopropenyl isopropyl ether, isopropenyl butyl ether, isopropenyl phenyl ether, isopropenyl amyl ether, isobutenyl ethyl ether, allyl methyl ether, allyl ethyl ether, allyl propyl ether, butenyl ethyl ether, butenyl propyl ether, pentenyl amyl ether, vinyl cyclohexyl ether, vinyl cyclopentyl ether, para-vinyl anisole, allyl benzyl ether, vinyl benzyl ether, vinyl phenethyl ether, isopropenyl phenethyl ether, etc.

For many purposes, such as fuel, it is desirable to have a high concentration of the metallo-organo polymeric units present in the compositions. In such cases, the modifiers are used in minor amounts. However, in certain cases, it may be desirable to use the metallo-organo polymeric compositions to modify or fortify the properties of other materials, in which case, the metallo-organo derivatives are used in minor amounts.

As indicated above, the metallo-organo polymers of this invention are particularly useful as solid fuels. They can be used as the main fuel component or can be added to various types of other fuels to fortify or supplement such fuels. For example, they can be used as additives to gasoline and other motor fuels, to kerosene and other materials used for turbojet engines and jet engines, and can be added to liquid and solid propellant fuels used for rockets, missiles, etc. However, these polymeric compositions are particularly useful as the main fuel component in solid propellant fuels used for rockets and related devices. In such latter cases, it is advantageous to convert the fuel to an infusible form. If modifiers, or auxiliary agents, are to be added, this can be effected before conversion to infusibility. Depending on the particular manner in which the fuel is to be used, it can be in solution, powder, rod, cylinder, or whatever other shape is convenient.

While such products should be made and stored under inert atmospheres, it is surprising that considerable amounts of oxidizing agents can be incorporated into these polymeric compositions and can be stored in inert atmospheres without danger of premature ignition or explosion. After the desired amount of oxidizing agent has been incorporated into the polymeric composition, it can be converted to an infusible form by various means including the addition of the metallo-organo compounds or catalysts to catalyze further metallo addition to unsaturated groups, the application of moderate heating for similar addition, or effecting crosslinking through the unsaturated groups themselves by heat alone, or by the addition of peroxy, azo, or other free radical-generating catalysts, or by any other means of crosslinking. The organo-metallo polymers can also be in infusible form before mixture with the oxidizing agent, having the polymers in finely divided form for intimate mixture. In such cases, if desired, the powder mixture can be cast by the addition of adhesive or resin.

In addition to oxygen-containing materials, such as free oxygen, hydrogen peroxide, etc., sometimes used to support combustion of fuels, other "oxidizing" materials, such as fluorine, chlorine, etc., can also be used to generate energy from these fuels.

Oxidizing agents which can be incorporated in the resin for the ultimate purpose of supporting combustion of the resin and which can be incorporated in accordance with safety conditions determined by their reactivity, include: the solid and liquid perchloryl aryl compounds of the formula Ar—Cl—$O_3$, such as perchloryl benzene, perchloryl toluene, etc., various perchlorates, nitrates, oxides, persulfates, and perborates of metals and ammonia, such as ammonium perchlorate, potassium perchlorate, sodium perchlorate, ammonium nitrate, potassium nitrate, sodium nitrate, potassium permanganate, potassium chlorate, manganese dioxide, potassium iodate, potassium dichromate, chloric acid, perchloric acid, ammonium persulfate, ammonium dichromate, ammonium iodate, aluminum nitrate, barium chlorate, barium perchlorate, barium permanganate, lithium perchlorate, lithium dichromate, lithium permanganate, etc.

Some of these oxidizing agents are not self-sustaining oxidizing agents, and can be used when free oxygen, or compositions such as perchloryl fluoride, highly concentrated hydrogen peroxide, etc., which generate oxygen in situ, are passed in surface contact with the fuel. The liquid oxidizing agents can be incorporated with precautions to assure uniform distribution through the polymer mass and to avoid ignition or explosive conditions during preparation and use of the fuel. It is desirable that the products from reaction of the oxidizing agent and the resin are gaseous in their normal state so that the energy developed in the system will not be robbed of energy to convert them to the gaseous state.

It is generally desirable that the fuel be molded in the shape in which it is ultimately to be used before the composition is converted to an infusible state. In fact, the fuel can even be cast or molded as one entire unit which will comprise the entire fuel load for one rocket and can be substantially as long as the rocket if desired. Therefore, the size is limited only by the size of the rocket in which it is to be used.

It is possible to make the fuel in other shapes than indicated above and have the fuel machined to give the desired shape. For example, cylindrical shapes are generally desirable with an opening running through the cylinder along its linear axis. If desired, there can be a plurality of such openings running through the length of the mass so that more than one oxidizing stream can function simultaneously. However, various other shapes can be used, such as blocks having rectangular or square cross sections with one or more openings running along the linear axis of the block.

While the aforementioned shapes are preferred, it is also possible to use smaller units or shapes made by the practice of this invention, and then to assemble them in a space or container advantageously in such a manner that one or more open linear paths are left through the assembled mass so that the oxidizing gas and/or the combustion gases can be passed therethrough. For example, the fuel can be in the shape of discs with an opening in the center, or in half or quarter discs, or even with rectangular, square, or various other cross-sections so that upon assembly, one or more openings for the oxidizing gas are formed through the assembled mass. A cylindrical mass can be made of a number of concentric cylinders for which the outer diameter of one is slightly less than the diameter of the inside linear opening of another so that the assembled cylindrical mass actually comprises a number of cylindrical sleeves which fit over one another. The axial opening of the one having the smallest diameter would be the linear axis opening of the assembled mass.

In addition to the foregoing, the resin-oxidizing agent composition can be made in various other shapes, depending on the manner in which it is ultimately to be used. As a further example, it can be shaped as a solid rod, in which case the burning surface will be the outer surface of the rod or cylinder. The outer surface of the rod can be ignited and if a supplementary oxidizing fluid is used, this can be directed against such outer surface of the rod. If desired, the rod can be advanced through an opening in accordance with the desired rate at which the surface is to be exposed to a supplementary oxidizing fluid. The composition can also be shaped in the form of granules, pellets, etc., where it is desired to modify the surface area that is to be exposed for combustion. Such granules can be used as such, or can be adhered to metal surfaces in accordance with the present known art in the use of solid propellant fuel in granular form.

When the oxidizing agent to be added is a solid, it is desirably in fine particle size so as to permit substantially uniform distribution throughout the mass. The oxidizing composition which is to be passed in surface contact with the fuel is of the type generally used presently, such as pure or highly concentrated oxygen. The upper limit in the amount of oxidizing agent to be used is determined by the concentration that can safely be used under the conditions ultimately existing in the fuel zone of the rocket, or by that excess over the stoichiometric amount required for complete combustion of the fuel, whichever limit is reached first. Obviously, the safety limit will vary according to the type of auxiliary oxidizing agent used, the type of fuel base material used together with its heat capacity and heat transmission properties, the temperature which will exist in the preparation and use of the fuel, etc.

Since the fuel composition of this invention can be used according to various methods, varying from the use of a substantial amount of supplemental oxidizing fluid to that in which the combustion is self-sustained by the oxidizing compound contained in the fuel, the minimum amount of such oxidizing agent contained in the fuel will depend on the manner in which the fuel is to be used. When the combustion is to be maintained partly by an oxidizing agent in the fuel and partly by the oxidizing agent pumped through the opening, then obviously the supplemental effect of one agent toward the other will depend on the particular material being used as the oxidizing agent in the fuel and on the particular oxidizing fluid being fed through the opening.

Moreover, in each case the relative amounts cannot be determined on a weight basis but must be determined on the basis of the amount of oxygen available in the particular oxidizing agent used to support the combustion. This depends on the oxygen content of the oxidizing agent and the percent of that oxygen which is liberated for oxidizing purposes upon decomposition of the oxidizing agent. Furthermore, this depends somewhat on the efficiency with which it is desired to consume the fuel. For example, it might be desirable to have a considerable excess of oxidizing agent so as to consume the fuel more completely, even though it might mean an inefficient use of the oxidizing agent. Again, if it is permissible to use the fuel with a low efficiency for use of B.t.u. content, then it may be desirable to use a smaller amount of oxidizing agent.

The amount of oxidizing agent imbedded in the fuel itself can be further decreased when a supplemental oxidizing fluid is being pumped into contact with the fuel. Obviously, therefore, the proportion of oxidizing agent imbedded in the fuel base material can vary from 5 percent to approximately 95 percent depending on the various factors involved, such as the efficiency desired, the method and convenience of operation, and the materials being used. Generally, when an oxidizing agent is imbedded in the base material, it is advantageous to use from about 5 percent to 95 percent, preferably about 20 percent to about 80 percent based on the combined weight of oxidizing agent, base material, and any crosslinking modifier that is used.

When an oxidizing agent is used in the fuel base material of the type and in the amount that will be self-sustaining in the combustion of the fuel base material, there will be no need to use an oxidizing fluid on the surface of the fuel. In such cases, the combustion of the fuel is initiated by igniting it by various means presently used for that purpose, such as a mixture of hydrazine, or unsymmetrical dimethyl hydrazine, and nitric acid, or by triethyl aluminum and oxygen, or by a torch, or by an electrical ignition system. When the oxidizing agent is not present in self-sustaining amount, liquid oxygen or an efficient oxidizing compound such as perchloryl fluoride ($FClO_3$) can be pumped into contact with the surface of the fuel to supply the oxygen for combustion. In some cases highly concentrated hydrogen peroxide, such as 98 percent hydrogen peroxide can be used to supply oxygen for combustion.

When a self-sustaining oxidizing agent is distributed throughout the fuel, the desirable amount can be determined by calculating the stoichiometric equivalent required for combustion of the fuel, and adjusting the calculation by subtracting, where less than 100 percent efficiency is satisfactory, or adding, where desired, an excess to compensate for the lack of 100 percent efficiency in the actual combustion. Since the conditions of operation do not permit the time and type of mixing which give 100 percent efficiency, where other factors permit, it is sometimes desirable to have an excess of oxidizing agent which will give 50 percent, or even as high as 100 percent more than the stoichiometric amount of oxygen. When it is permissible or desirable to sacrifice some of the efficiency of the B.t.u. content of the fuel, the stoichiometric amount or even less than that amount of the oxidizing agent can be used, depending on the fuel efficiency desired.

The oxidizing agent and/or modifier can be introduced or suspended in the solid fuel in any convenient or appropriate manner. The mixture can be effected mechanically as on mixing mills, on a Banbury mixer, any single or double worm extruder, or by rotation of the mold when the material is being cast from a liquid state. When a solid is to be added, thermoplastic material can desirably be softened by the addition of a softening agent, or, as indicated above, by the modifier itself. Such compounded mixtures can then be extruded, or otherwise shaped into the desired form and then polymerized to infusibility. In some cases, depending on the particle size of the solid oxidizing agent and the amount of void space between particles, the polymer in fluid state, or the intermediate from which it is to be prepared, can be poured into a container holding the solid oxidizing agent and thereby fill the void spaces. Then upon standing at room temperature, or at slightly raised temperatures, the polymer will be converted to an infusible state with the oxidizing agent embedded therein.

However, whichever method of mixing is used, it is desirable to avoid the generation of heat that will raise the temperature to the ignition point of the oxidizing agent. Therefore, in some cases, it is desirable to precool the materials to be mixed, or to provide means to withdraw the heat as it is generated.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. A polymeric composition useful as a solid propellant fuel consisting essentially of 5–95 percent by weight of an oxidizer selected from the class consisting of perchlorates, nitrates, persulfates and perborates of sodium, potassium and ammonia, potassium chlorate, manganese dioxide, potassium iodate, potassium dichromate, chloric acid, perchloric acid, ammonium dichromate, ammonium iodate, barium chlorate, barium perchlorate, barium permanganate, lithium perchlorate, lithium dichromate, lithium permanganate, and aryl perchloryl compounds and 95–5 percent by weight of a polymer having a plurality of repeating units in the polymer molecules thereof having the formula $$-\underset{\underset{X}{|}}{Al}-Y-$$

in which X is a group selected from a class consisting of Y and R groups, R is a member of the class consisting of hydrogen and hydrocarbon radicals having no more than 24 carbon atoms therein, and Y is a polyvalent hydrocarbon radical having each of its valencies attached to an aluminum atom.

2. A polymeric composition of claim 1 in which said polymer has a plurality of repeating units in the polymer molecules thereof having the formula $$-\underset{\underset{C_2H_5}{|}}{Al}-C_2H_4C_6H_4C_2H_4-$$

3. A polymeric composition of claim 1 in which said polymer has a plurality of repeating units in the polymer molecules thereof having the formula $$-\underset{\underset{C_3H_7}{|}}{Al}-C_6H_{12}-$$

4. A polymeric composition of claim 1 in which said polymer has a plurality of repeating units in the polymer molecules thereof having the formula $$-\underset{\underset{C_2H_5}{|}}{Al}-C_2H_4C_6H_{10}C_2H_4-$$

5. A polymeric composition of claim 1 in which said polymer has a plurality of repeating units in the polymer molecules thereof having the formula $$-\underset{\underset{C_2H_5}{|}}{Al}-C_3H_6C_6H_{10}C_3H_6-$$

6. A polymeric composition of claim 1 in which said polymer has a plurality of repeating units in the polymer molecules thereof having the formula $$-\underset{\underset{C_2H_5}{|}}{Al}-C_4H_8-$$

7. A polymeric composition of claim 1 in which said polymer has a plurality of repeating units in the polymer molecules thereof having the formula $$-\underset{\underset{C_2H_5}{|}}{Al}-\underset{\underset{CH_3}{|}}{C_4H_7}-$$

8. A polymeric composition of claim 1 in which said polymer has a plurality of repeating units in the polymer molecules thereof having the formula $$-\underset{\underset{C_2H_5}{|}}{Al}-C_2H_4-$$

9. A polymeric composition of claim 1 in which said polymer has a plurality of repeating units in the polymer molecules thereof having the formula $$-CH_2CH-\\ \underset{\underset{Al-(C_2H_5)_2}{|}}{\underset{C_2H_4}{|}}$$

10. A polymeric composition of claim 1 in which said polymer has a plurality of repeating units in the polymer molecules thereof having the formula $$-CH_2-CH-\\ \underset{\underset{\underset{Al(C_2H_5)_2}{|}}{\underset{C_2H_4}{|}}}{\underset{C_6H_4}{|}}$$

11. A polymeric composition of claim 1 in which said oxidizer is potassium perchlorate.

12. A polymeric composition of claim 1 in which said oxidizer is ammonium perchlorate.

13. A polymeric composition of claim 1 in which said oxidizer is an aryl perchloryl compound.

14. A polymeric composition of claim 1 in which said oxidizer is perchloryl benzene.

15. A polymeric composition of claim 1 in which said oxidizer is lithium perchlorate.

16. A polymeric composition of claim 1 in which said oxidizer is sodium perchlorate.

17. A polymeric composition of claim 1 in which said oxidizer is potassium perchlorate and said polymer has a plurality of repeating units in the polymer molecules thereof having the formula

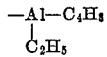

18. A polymeric composition of claim 1 in which said oxidizer is potassium perchlorate and said polymer has a plurality of repeating units in the polymer molecules thereof having the formula

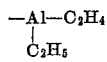

19. A polymeric composition of claim 1 in which said oxidizer is potassium perchlorate and said polymer has a plurality of repeating units in the polymer molecules thereof having the formula

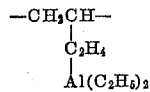

20. A polymeric composition of claim 1 in which said oxidizer is potassium perchlorate and said polymer has a plurality of repeating units in the polymer molecules thereof having the formula

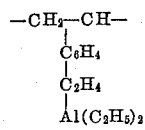

No references cited.